(12) United States Patent
Bi et al.

(10) Patent No.: US 12,114,244 B2
(45) Date of Patent: Oct. 8, 2024

(54) COMMUNICATION METHOD AND DEVICE

(71) Applicant: Huawei Technologies Co., Ltd., Shenzhen (CN)

(72) Inventors: Wenping Bi, Shenzhen (CN); Zheng Yu, Beijing (CN); Yubo Yang, Shanghai (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 17/487,965

(22) Filed: Sep. 28, 2021

(65) Prior Publication Data
US 2022/0022021 A1    Jan. 20, 2022

Related U.S. Application Data

(63) Continuation of application No. PCT/CN2019/120061, filed on Nov. 21, 2019.

(30) Foreign Application Priority Data

Mar. 29, 2019  (WO) ................. PCT/CN2019/080645
Oct. 16, 2019  (WO) ................. PCT/CN2019/111545

(51) Int. Cl.
*H04W 4/90*    (2018.01)
*H04L 1/00*    (2006.01)
(Continued)

(52) U.S. Cl.
CPC .............. *H04W 4/90* (2018.02); *H04L 1/0061* (2013.01); *H04W 4/70* (2018.02); *H04W 52/58* (2013.01)

(58) Field of Classification Search
CPC ......... H04W 4/70; H04W 52/58; H04W 4/90; H04L 1/0061
(Continued)

(56) References Cited

U.S. PATENT DOCUMENTS

2013/0203450 A1*  8/2013  Mochizuki ............ H04W 68/00
                                                                455/458
2015/0358998 A1* 12/2015  Golitschek Edler Von
                                                Elbwart ................ H04L 1/0061
(Continued)

FOREIGN PATENT DOCUMENTS

CN    102868467 A    1/2013
CN    106211329 A    12/2016
(Continued)

OTHER PUBLICATIONS

"3rd Generation Partnership Project; Technical Specification Group Radio Access Network; Evolved Universal Terrestrial Radio Access (E-UTRA); Physical layer procedures (Release 15)," 3GPP TS 36.213 V15.5.0, Total 10 pages, 3rd Generation Partnership Project, Valbonne, France (Mar. 2019).
(Continued)

*Primary Examiner* — Maria El-Zoobi
(74) *Attorney, Agent, or Firm* — Leydig, Voit & Mayer, Ltd.

(57) ABSTRACT

A communication method includes: a first device determines first control information, where the first control information carries first information, and the first information is used to indicate emergency information; and the first control information is format-3 control information, format-3A control information, format-6-0A control information, format-6-0B control information, format-6-1A control information, or format-6-1B control information; the first device sends the first control information to a second device; and the first device sends the emergency information to the second device. The method expands coverage of a network, and may be applied to an internet of things (IoT), for example, machine type communication (MTC), a long term evolution-machine (LTE-M), or machine-to-machine (M2M).

20 Claims, 2 Drawing Sheets

(51) Int. Cl.
*H04W 4/70* (2018.01)
*H04W 52/58* (2009.01)

(58) Field of Classification Search
USPC .......................................... 455/404.01, 458
See application file for complete search history.

(56) References Cited

U.S. PATENT DOCUMENTS

| | | | |
|---|---|---|---|
| 2018/0014284 A1 | 1/2018 | Yi et al. | |
| 2018/0041857 A1* | 2/2018 | Ouchi | H04W 72/12 |
| 2018/0041997 A1 | 2/2018 | Babaei et al. | |
| 2018/0234826 A1 | 8/2018 | Maattanen et al. | |

FOREIGN PATENT DOCUMENTS

| | | |
|---|---|---|
| CN | 106559809 A | 4/2017 |
| CN | 107925983 A | 4/2018 |
| CN | 108353343 A | 7/2018 |
| EP | 3253160 A1 | 12/2017 |
| EP | 3301850 A1 | 4/2018 |
| EP | 3331177 A1 | 6/2018 |
| JP | 2018526898 A | 9/2018 |
| WO | 2016186044 A1 | 11/2016 |
| WO | 2017078023 A1 | 5/2017 |
| WO | 2017113391 A1 | 7/2017 |
| WO | 2018093208 A1 | 5/2018 |
| WO | 2018143849 A1 | 8/2018 |

OTHER PUBLICATIONS

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.4.0, pp. 1-198, 3rd Generation Partnership Project, Valbonne, France (Sep. 2017).

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.5.0, pp. 1-246, 3rd Generation Partnership Project, Valbonne, France (Mar. 2019).

"Coverage enhancement for Non-BL UE," 3GPP TSG RAN WG1 Meeting #96bis, R1-1903915, Xi'an, China, Total 3 pages, 3rd Generation Partnership Project, Valbonne, France (Apr. 8-12, 2019).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.4.0, pp. 1-933, 3rd Generation Partnership Project, Valbonne, France (Dec. 2018).

"Coverage enhancement for Non-BL UE," 3GPP TSG RAN WG1 Meeting #94bis, R1-1810093, Chengdu, China, Total 3 pages, 3rd Generation Partnership Project, Valbonne, France (Oct. 8-12, 2018).

"ETWS and CMAS notifications for feMBMS carrier," 3GPP TSG-RAN WG2 Meeting #97, R2-1701612, Athens, Greece, pp. 1-4, 3rd Generation Partnership Project, Valbonne, France (Feb. 13-17, 2017).

"[Draft] LS on USS direct indication for ETWS/CMAS for eMTC," 3GPP TSG RAN WG2 Meeting #104, R2-1816549, Spokane, USA, Total 1 page, 3rd Generation Partnership Project, Valbonne, France (Nov. 12-16, 2018).

* cited by examiner

COMMUNICATION METHOD AND DEVICE

CROSS-REFERENCE TO RELATED APPLICATIONS

This application is a continuation of International Application No. PCT/CN2019/120061, filed on Nov. 21, 2019, which claims priority to International Application No. PCT/CN2019/111545, filed on Oct. 16, 2019, and International Application No. PCT/CN2019/080645, filed on Mar. 29, 2019. All of the aforementioned patent applications are hereby incorporated by reference in their entireties.

TECHNICAL FIELD

This application relates to the field of communication technologies, and in particular, to a communication method and device.

BACKGROUND

Currently, a fourth generation communication system, namely, a long term evolution-advanced (LTE-A) system continues to provide a wireless communication service for its user equipment (UE) in a short term (or even a long term). In particular, an enhanced machine type communication (eMTC) system and another evolved system (for example, further eMTC (FeMTC), even further eMTC (eFeMTC), additional MTC (AMTC)) are systems derived from LTE. The eMTC system and the another evolved system operate in LTE systems and in LTE frequency bands. To reduce power consumption and costs, an operating bandwidth of an eMTC terminal may be generally relatively small and less than an operating bandwidth of an LTE system. For example, the operating bandwidth of the eMTC terminal may be one narrowband NB. One NB includes 6 consecutive physical resource blocks (PRB), and one PRB includes 12 subcarriers (SC). A battery life of eMTC UE is relatively long due to features such as low power consumption and long sleep of the eMTC UE, and is expected to be approximately 10 years.

To reduce power consumption and detection complexity of eMTC terminals, for an eMTC terminal in a connected state, only user-specific search space and Type0 common search space that is used to transmit power control information of a terminal group (UE group) can be detected.

In an existing technology, emergency information (for example, earthquake and tsunami warning system (ETWS) information, commercial mobile alert service (CMAS) information, and information that is used to indicate a system information modification) is carried in a system message. To reduce power consumption, an eMTC terminal device does not update a system message very frequently. Therefore, when there is an emergency message, a base station notifies a terminal device by using a paging message or direct indication information. However, the paging message or the direct indication information is carried in Type2 common search space, and the eMTC terminal in the connected state does not monitor the search space. Consequently, the eMTC terminal in the connected state cannot receive an emergency message notification.

In a possible solution, the eMTC terminal device in the connected state is allowed to monitor both the Type2 search space and user-specific search space, in other words, the eMTC terminal device in the connected state is allowed to receive the paging message or the direct indication information. However, because the paging message and the user-specific search space may be located on different narrowbands, the eMTC terminal device needs to monitor the two narrowbands simultaneously. Consequently, user complexity and user power consumption are greatly increased.

SUMMARY

Embodiments of this application provide a communication method and device, to resolve a problem in an existing technology that complexity and power consumption are relatively high when an eMTC terminal device in a connected state receives an emergency message notification.

According to a first aspect, an embodiment of this application provides a communication method. The method includes: a first device determines first control information, where the first control information carries first information, and the first information is used to indicate emergency information; and the first control information is format-3 control information, format-3A control information, format-6-0A control information, format-6-0B control information, format-6-1A control information, or format-6-1B control information. The first device sends the first control information to a second device. In addition, the first device sends the emergency information to the second device.

In this embodiment of this application, the first device may indicate the second device to receive the emergency information by using the format-3, format-3A, format-6-0A, format-6-0B, format-6-1A, or format-6-1B control information. The format-3 control information and the format-3A control information are group control information, and are carried in Type0 common search space; and the format-6-0A control information, the format-6-0B control information, the format-6-1A control information, and the format-6-1B control information are user-specific information, and are carried in user-specific search space. Therefore, the second device does not need to monitor Type2 search space when receiving the emergency information, so that user complexity is not increased, and user power consumption is reduced.

Compared with a manner, in an existing technology, of increasing bits in user-specific control information to indicate the emergency information, the control information, used in this embodiment of this application, in the foregoing formats does not need to indicate the emergency information by increasing additional bits. Therefore, an increase of control information overheads can be avoided, a decrease of spectral efficiency can further be avoided, and an increase of user power consumption can be avoided.

In addition, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device.

In a possible design, the first control information is downlink control information.

In a possible design, the first control information may be the format-3 or format-3A control information, K transmit power control command numbers (TPC command number) in the first control information are used to indicate the first information, and K is an integer greater than or equal to 1. The TPC command number may also be referred to as a TPC command, and each TPC command includes two bits. In the foregoing design, the first information is indicated by using a TPC command of the format-3 control information or the format-3A control information, so that the first control information can indicate the first information without changing a quantity of bits. Therefore, no additional bit needs to be increased to indicate the emergency information, an increase of control information overheads can be avoided, a decrease of spectral efficiency can be avoided, and an increase of user power consumption can be avoided. In addition, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device. Furthermore, the format-3 control information and the format-3A control information are carried in the Type0 common search space. Therefore, the second device does not need to monitor the Type2 search space when receiving the emergency information, so that user complexity is not increased, and user power consumption is reduced. In addition, an existing protocol only needs to be slightly modified.

In the foregoing design, the K TPC commands may not be assigned to any second device to transmit power control information, but are used to indicate the first information.

In a possible design, the first control information may alternatively include M TPC commands (or TPC command numbers), the M TPC commands are used to indicate transmit power control commands of H second devices, and M and H are integers greater than or equal to 0.

In a possible design, the K TPC commands are predefined, or the K TPC commands are determined by the first device and are configured for the second device by using higher layer signaling.

In a possible design, the first control information is the format-3 or format-3A control information, Q bits, other than a TPC command, in the first control information are used to indicate the first information, and Q is an integer greater than or equal to 1. That is, the first control information includes Q bits and N TPC commands, the Q bits are used to indicate the first information, and the N TPC commands are used to indicate (or transmit) transmit power control information of a plurality of second devices. In the foregoing design, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device. Furthermore, the format-3 control information and the format-3A control information are carried in the Type0 common search space. Therefore, the second device does not need to monitor the Type2 search space when receiving the emergency information, so that user complexity is not increased, and user power consumption is reduced. In addition, an existing protocol only needs to be slightly modified.

In a possible design, the first control information is the format-3 or format-3A control information, the first control information includes Q bits, the Q bits are used to indicate the first information, and Q is an integer greater than or equal to 1. In the foregoing design, the first control information may be used to indicate only an emergency information notification, but does not need to be used to indicate (or transmit) transmit power control information.

In a possible design, before sending the first control information to the second device, the first device may determine second information, where the second information is used to indicate that the first control information includes the first information; and send the second information to the second device. According to the foregoing design, after receiving the second information, the second device may obtain the first information from the first control information, thereby improving accuracy of obtaining the emergency information notification.

In a possible design, the first control information may be the format-6-1A or format-6-1B control information; and when all bits of a resource block assignment field of the first control information are set to 1, a first field of the first control information is used to indicate the first information. In the foregoing design, the format-6-1A control information and the format-6-1B control information are user-specific messages and are carried in user-specific search space. Therefore, the second device does not need to monitor the Type2 search space when receiving the emergency information, so that user complexity is not increased, and user power consumption is reduced. In addition, in the foregoing design, the emergency information is indicated by using redundancy statuses of the format-6-1A control information and the format-6-1B control information, thereby avoiding increasing control information overheads, reducing user power consumption, and improving system resource utilization.

In a possible design, the first field may be a physical random access channel mask index (PRACH Mask index) field.

In a possible design, the first control information may be the format-6-0B control information; and when all bits of a modulation and coding scheme field of the first control information are set to 1, a second field of the first control information is used to indicate the first information; or the first control information may be the format-6-0A control information; and when all bits of a resource block assignment field of the first control information are set to 1, a third field of the first control information is used to indicate the first information. In the foregoing design, the format-6-0A control information and the format-6-0B control information are user-specific messages and are carried in user-specific search space. Therefore, the second device does not need to monitor the Type2 search space when receiving the emergency information, so that user complexity is not increased, and user power consumption is reduced. In addition, in the foregoing design, the emergency information is indicated by using redundancy statuses of the format-6-0A control information and the format-6-0B control information, thereby avoiding increasing control information overheads, reducing user power consumption, and improving system resource utilization.

In a possible design, a cyclic redundancy check (CRC) code of the first control information may be scrambled by a first scrambling code, where the first scrambling code may be a system information radio network temporary identifier (SI-RNTI).

In a possible design, when a CRC code of the first control information is scrambled by a second scrambling code, the first control information may include only the emergency information notification or the first control information is used to indicate that the first information or the first control information includes the emergency information, where the second scrambling code may be an SI-RNTI.

In a possible design, the emergency information may include one or more pieces of the following information: ETWS information, CMAS information, and information that is used to indicate a system information modification. The ETWS information, the CMAS information, and the information that is used to indicate the system information modification may be respectively referred to as an ETWS indication or an ETWS notification, a CMAS indication or a CMAS notification, and a system information modification indication or a system information modification notification.

According to a second aspect, an embodiment of this application provides a communication method. The method includes: a second device receives first control information sent by a first device, where the first control information carries first information, and the first information is used to indicate emergency information; and the first control information is format-3 control information, format-3A control information, format-6-0A control information, format-6-0B control information, format-6-1A control information, or format-6-1B control information. The second device receives the emergency information based on the first information in the first control information.

In this embodiment of this application, the first device may indicate the second device to receive the emergency information by using the format-3, format-3A, format-6-0A, format-6-0B, format-6-1A, or format-6-1B control information. The format-3 control information and the format-3A control information are group control information, and are carried in Type0 common search space; and the format-6-0A control information, the format-6-0B control information, the format-6-1A control information, and the format-6-1B control information are user-specific messages, and are carried in user-specific search space. Therefore, the second device does not need to monitor Type2 search space when receiving the emergency information, so that user complexity is not increased, and user power consumption is reduced.

Compared with a manner, in an existing technology, of increasing bits in user-specific control information to indicate the emergency information, the control information, used in this embodiment of this application, in the foregoing formats does not need to indicate the emergency information by increasing additional bits. Therefore, an increase of control information overheads can be avoided, a decrease of spectral efficiency can further be avoided, and an increase of user power consumption can be avoided.

In addition, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device.

In a possible design, the first control information is downlink control information.

In a possible design, the first control information may be the format-3 or format-3A control information, K TPC command numbers in the first control information are used to indicate the first information, and K is an integer greater than or equal to 1. The TPC command number may be referred to as a TPC command, and each TPC command includes two bits. In the foregoing design, the first information may be indicated by using a TPC command of the format-3 control information or the format-3A control information, so that the first control information can indicate the first information without changing a quantity of bits. Therefore, no additional bit needs to be increased to indicate the emergency information, an increase of control information overheads can be avoided, a decrease of spectral efficiency can be avoided, and an increase of user power consumption can be avoided. In addition, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device. Furthermore, the format-3 control information and the format-3A control information are carried in the Type0 common search space. Therefore, the second device does not need to monitor the Type2 search space when receiving the emergency information, so that user complexity is not increased, and user power consumption is reduced. In addition, an existing protocol only needs to be slightly modified.

In the foregoing design, the K TPC commands may not be assigned to any second device to transmit power control information, but are used to indicate the first information.

In a possible design, the first control information may alternatively include M TPC commands (or TPC command numbers), the M TPC commands are used to indicate transmit power control commands of H second devices, and M and H are integers greater than or equal to 0.

In a possible design, the K TPC commands may be predefined, or the K TPC commands may be determined by the second device by receiving higher layer signaling sent by the first device.

In a possible design, the first control information may be the format-3 or format-3A control information, Q bits, other than a TPC command, in the first control information are used to indicate the first information, and Q is an integer greater than or equal to 1. That is, the first control information includes Q bits and N TPC commands, the Q bits are used to indicate the first information, and the N TPC commands are used to indicate (or transmit) transmit power control information of a plurality of second devices. In the foregoing design, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device. Furthermore, the format-3 control information and the format-3A control information are carried in the Type0 common search space. Therefore, the second device does not need to monitor the Type2 search space when receiving the emergency information, so that user complexity is not increased, and user power consumption is reduced. In addition, an existing protocol only needs to be slightly modified.

In a possible design, the first control information is the format-3 or format-3A control information, the first control information includes Q bits, the Q bits are used to indicate the first information, and Q is an integer greater than or equal to 1. In the foregoing design, the first control information may be used to indicate only an emergency information notification, but does not need to be used to indicate (or transmit) transmit power control information.

In a possible design, before receiving the first control information sent by the first device, the second device may receive second information sent by the first device, where the second information is used to indicate that the first control information includes the first information. According to the foregoing design, after receiving the second information, the second device may obtain the first information from the first control information, thereby improving accuracy of obtaining the emergency information notification.

In a possible design, the first control information may be the format-6-1A or format-6-1B control information; and when all bits of a resource block assignment field of the first control information are set to 1, a first field of the first control information is used to indicate the first information. In the foregoing design, the format-6-1A control information and the format-6-1B control information are user-specific messages and are carried in user-specific search space. Therefore, the second device does not need to monitor the Type2 search space when receiving the emergency information, so that user complexity is not increased, and user power consumption is reduced. In addition, in the foregoing design, the emergency information is indicated by using redundancy statuses of the format-6-1A control information and the format-6-1B control information, thereby avoiding increasing control information overheads, reducing user power consumption, and improving system resource utilization.

In a possible design, the first field may be a PRACH mask index field.

In a possible design, the first control information may be the format-6-0B control information; and when all bits of a modulation and coding scheme field of the first control information are set to 1, a second field of the first control information is used to indicate the first information; or the first control information may be the format-6-0A control information; and when all bits of a resource block assignment field of the first control information are set to 1, a third field of the first control information is used to indicate the first information. In the foregoing design, the format-6-0A control information and the format-6-0B control information are user-specific messages and are carried in user-specific search space. Therefore, the second device does not need to monitor the Type2 search space when receiving the emergency information, so that user complexity is not increased, and user power consumption is reduced. In addition, in the foregoing design, the emergency information is indicated by using redundancy statuses of the format-6-0A control information and the format-6-0B control information, thereby avoiding increasing control information overheads, reducing user power consumption, and improving system resource utilization.

In a possible design, a CRC code of the first control information may be scrambled by a first scrambling code, where the first scrambling code may be an SI-RNTI.

In a possible design, when a CRC code of the first control information is scrambled by a second scrambling code, the first control information may include only the emergency information notification or the first control information is used to indicate that the first information or the first control information includes the emergency information, where the second scrambling code may be an SI-RNTI.

In a possible design, the emergency information may include one or more pieces of the following information: ETWS information, CMAS information, and information that is used to indicate a system information modification. The ETWS information, the CMAS information, and the information that is used to indicate the system information modification may be respectively referred to as an ETWS indication or an ETWS notification, a CMAS indication or a CMAS notification, and a system information modification indication or a system information modification notification.

According to a third aspect, this application provides an apparatus. The apparatus may be a first device, a second device, or a chip. The apparatus has a function of implementing any embodiment of the first aspect or the second aspect. The function may be implemented by hardware, or may be implemented by hardware executing corresponding software. The hardware or software includes one or more modules corresponding to the foregoing function.

According to a fourth aspect, an apparatus is provided. The apparatus includes a processor, a communication interface, and a memory. The communication interface is configured to transmit information, and/or a message, and/or data between the apparatus and another apparatus. The memory is configured to store computer execution instructions. When the apparatus runs, the processor executes the computer execution instructions stored in the memory, so that the apparatus performs the communication method according to the first aspect or any possible design of the first aspect, or the communication method according to the second aspect or any possible design of the second aspect.

According to a fifth aspect, this application further provides a system. The system includes the first device in any embodiment of the first aspect and the second device in any embodiment of the second aspect.

According to a sixth aspect, this application further provides a computer-readable storage medium. The computer-readable storage medium stores instructions. When the instructions are run on a computer, the computer is enabled to perform the method according to each of the foregoing aspects.

According to a seventh aspect, this application further provides a computer program product including instructions. When the computer program product runs on a computer, the computer is enabled to perform the method according to each of the foregoing aspects.

DESCRIPTION OF EMBODIMENTS

Figure 1:
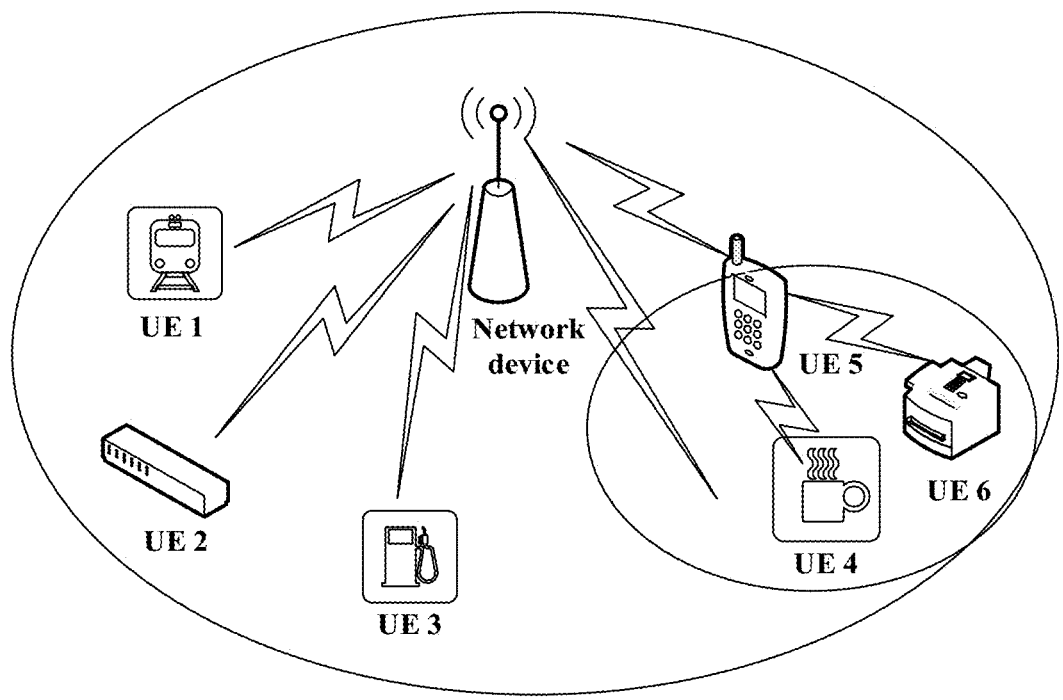
FIG. 1 is a schematic architectural diagram of a communication system according to an embodiment of this application.

The following further describes in detail embodiments of this application with reference to the accompanying drawings.

A communication method provided in this application may be applied to various communication systems. For example, the communication systems may be an internet of things (IoT), a narrowband internet of things (NB-IoT), and a long term evolution (LTE) system; or may be a fifth generation (5G) communication system, a mixed architecture of LTE and 5G, a new radio (NR) in 5G, a global system for mobile communications (GSM), a universal mobile communication system (UMTS), a code division multiple access (CDMA) system, and a new communication system emerging in future communication development. The communication method provided in this embodiment of this application may be used provided that one entity in a communication system can send control information used to schedule a transport block and send and receive a transport block, and another entity in the communication system can receive control information used to schedule a transport block and receive and send a transport block.

A terminal device in the embodiments of this application is a device providing voice and/or data connectivity for a user, for example, a handheld device or a vehicle-mounted device having a wireless connection function. The terminal device may alternatively be another processing device connected to a wireless modem. The terminal device may communicate with one or more core networks via a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment, or the like. The terminal device may be a mobile terminal, for example, a mobile phone (or also referred to as a "cellular" phone), and a computer that has a mobile terminal. For example, the terminal device may be a portable, pocket-sized, handheld, computer built-in, or in-vehicle mobile apparatus, which exchanges voice and/or data with the radio access network. For example, the terminal device may further be a device such as a personal communication service (PCS) phone, a cordless phone, a session initiation protocol (SIP) phone, a wireless local loop (WLL) station, or a personal digital assistant (PDA). Common terminal devices include, for example, a mobile phone, a tablet computer, a notebook computer, a palmtop computer, a mobile internet device (MID), and a wearable device, such as a smart watch, a smart band, and a step counter. However, the embodiments of this application are not limited thereto.

A network device mentioned in the embodiments of this application may be configured to mutually convert a received over-the-air frame and an internet protocol (IP) packet and serve as a router between a terminal device and a rest portion of an access network, where the rest portion of the access network may include an IP network and the like. The network device may coordinate attribute management of an air interface. For example, the network device may be a base transceiver station (BTS) in a global system for mobile communication (GSM) or code division multiple access (CDMA), a NodeB in wideband code division multiple access (WCDMA), an evolved NodeB (eNB or e-NodeB) in LTE, a new radio controller (NR controller), a gNodeB (gNB) in a 5G system, a centralized network element (centralized unit), a new radio base station, a radio remote module, a micro base station, a relay, a distributed network element (distributed unit), a transmission reception point (TRP) or a transmission point (TP), or any other radio access device. However, the embodiments of this application are not limited thereto. The network device may cover one or more cells.

FIG. 1 shows a communication system according to an embodiment of this application. The communication system includes a network device and six terminal devices, that is, UE 1 to UE 6. In the communication system, the UE 1 to the UE 6 may send uplink data to the network device, and the network device may receive the uplink data sent by the UE 1 to the UE 6. In addition, the UE 4 to the UE 6 may also form a communication sub-system. The network device may send downlink information to the UE 1, the UE 2, the UE 3, and the UE 5, and the UE 5 may send downlink information to the UE 4 and the UE 6 based on a device-to-device (D2D) technology. FIG. 1 is merely a schematic diagram, and does not specifically limit a type of the communication system, and a quantity, a type, and the like of devices included in the communication system.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

In a communication system, UE may be in three states: an idle state, an inactive state, and a connected state. The UE in the connected state may be dynamically scheduled by a base station to communicate with the base station and transmit data. The UE in the idle state cannot be dynamically scheduled by the base station to transmit data. First, the UE in the idle state needs to perform random access, and can transmit data only after an RRC connection is established, or adds a small amount of uplink data to a message 3 in a random access process. The inactive state may be considered as an intermediate state of the two states. The UE and the core network retain a context of a radio resource control (RRC) message in the connected state. Therefore, compared with the idle state, the UE can enter the connected state at a faster speed. According to a current LTE protocol, when the UE changes from the RRC connected state to the idle state, an RRC configuration message is not retained, but the context of the RRC message is retained when the UE changes from the connected state to the inactive state.

Currently, a fourth generation communication system, namely, a long term evolution-advanced (LTE-A) system continues to provide a wireless communication service for its user equipment (UE) in a short term (or even a long term). In particular, an enhanced machine type communication (eMTC) system and another evolved system (for example, further eMTC (FeMTC), even further eMTC (eFeMTC), additional MTC (AMTC)) are systems derived from LTE. The eMTC system and the another evolved system operate in LTE systems and in LTE frequency bands. To reduce power consumption and costs, an operating bandwidth of an eMTC terminal may be generally relatively small and less than an operating bandwidth of an LTE system. For example, the operating bandwidth of the eMTC terminal may be one narrowband NB. One NB includes 6 consecutive physical resource blocks (PRB), and one PRB includes 12 subcarriers (SC). A battery life of eMTC UE is relatively long due to features such as low power consumption and long sleep of the eMTC UE, and is expected to be approximately 10 years.

In LTE, the terminal device obtains scheduling information by monitoring control channel search space, and then schedules data. The control channel search space in the LTE may be divided into user-specific search space and common search space. The user-specific search space is configured by each user, and each user is assigned with specific search space. The common search space is search space that is monitored by a group of users or users in one cell. Generally, a message sent in common search space is a common message of the cell. To reduce power consumption and detection complexity of terminals, for an eMTC terminal in a connected state, only user-specific search space and Type0 common search space that is used to transmit power control information of a terminal group needs to be detected. However, emergency information (for example, earthquake and tsunami warning system (ETWS) information, commercial mobile alert service (CMAS) information, and information that is used to indicate a system information modification) is carried in a system message. To reduce power consumption, an eMTC terminal device does not update a system message very frequently. Therefore, when there is an emergency message, a base station needs to notify a terminal device to receive the emergency message. In an existing technology, the emergency information notification is in a paging message or direct indication information, but the paging message or the direct indication information is in Type2 common search space, and the eMTC terminal device in the connected state does not monitor the search space. Therefore, the eMTC terminal device in the connected state cannot receive the emergency message notification. In this case, the eMTC terminal device can only roll back to the idle state to receive the paging message or the direct indication information, so as to receive the emergency information notification; and then, receive the emergency information. Consequently, a delay is relatively long and power consumption of the terminal device is increased.

A possible solution to this problem is that the eMTC terminal device in the connected state is allowed to monitor both the Type2 search space and the user-specific search space, in other words, the eMTC terminal device in the connected state is allowed to receive the paging message or the direct indication information. However, because the paging message and the user-specific search space may be located on different narrowbands, the eMTC terminal device in the connected state needs to monitor the two narrowbands simultaneously. Consequently, user complexity and user power consumption are greatly increased. In addition, if such a manner is used, an existing protocol needs to be greatly modified.

Based thereupon, embodiments of this application provide a communication method and device, to resolve a problem in an existing technology that complexity and power consumption are relatively high when an eMTC terminal device in a connected state receives an emergency message notification. The method and the apparatus are based on a same inventive concept. Because problem solving principles of the method and the device are similar, reference may be made to each other for implementation of the apparatus and the method. A repeated part is not described again.

In the embodiments of this application, "a plurality of" refers to two or more than two.

It should be understood that, in the descriptions of this application, terms such as "first" and "second" are only used for a purpose of distinguishing between descriptions, but cannot be understood as indicating or implying relative importance or indicating or implying a sequence.

Figure 2:
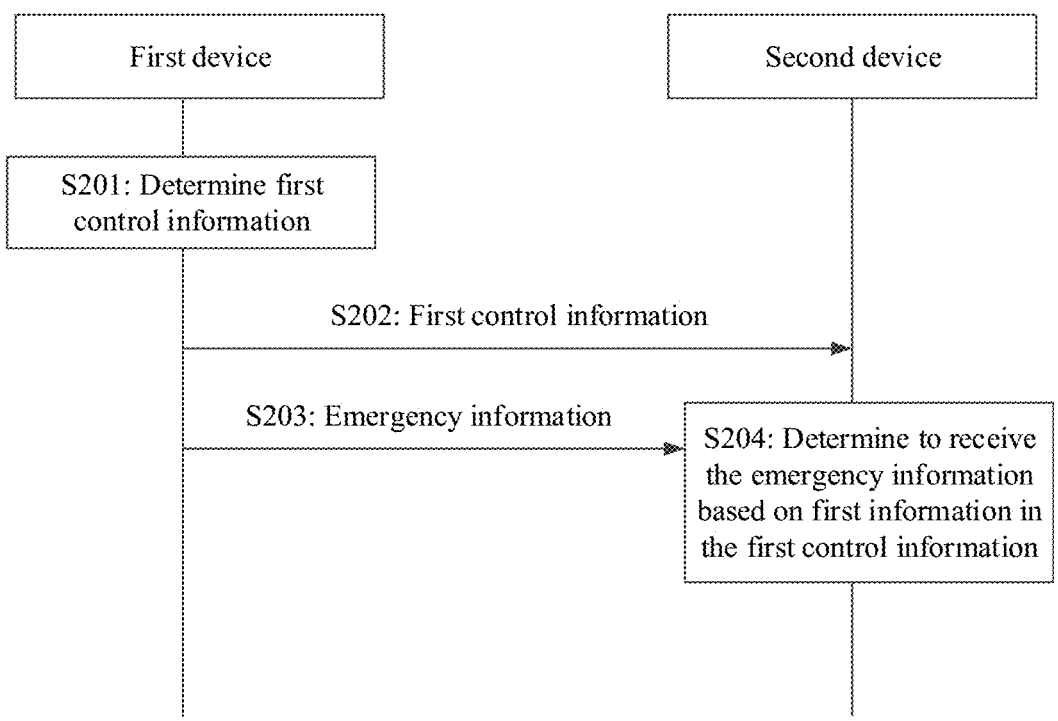
FIG. 2 is a schematic flowchart of a communication method according to an embodiment of this application.

FIG. 2 is a flowchart of a communication method according to this application. The method may be applied to the terminal device in the communication system shown in FIG. 1. The method includes the following steps.

S201: a first device determines first control information. The first control information carries first information, and the first information is used to indicate emergency information. The first control information is format-3 control information, format-3A control information, format-6-0A control information, format-6-0B control information, format-6-1A control information, or format-6-1B control information.

The emergency information may include one or more pieces of the following information: ETWS information, CMAS information, and information that is used to indicate a system information modification.

In this embodiment of this application, the ETWS information, the CMAS information, and the information that is used to indicate the system information modification may be respectively referred to as an ETWS indication or an ETWS notification, a CMAS indication or a CMAS notification, and a system information modification indication or a system information modification notification.

For example, the first control information may be downlink control information in an LTE eMTC system or downlink control information in an NR system. This is not specifically limited herein. For ease of description, an example in which the first control information is downlink control information (DCI) is used below.

In an example description, when indicating the emergency information, the first information may specifically indicate a type and/or a notification of the emergency information.

In addition, if the first device determines that there is no emergency information, the first device may further indicate, by using the first control information, that there is no emergency information.

The first device may be a network device, and a second device is a terminal device. Alternatively, the first device may be a terminal device, and the second device is a network device. Alternatively, the first device may be another device having a sending capability, and the second device may be another device having a receiving capability.

S202: the first device sends the first control information to the second device; and correspondingly, the second device receives the first control information.

S203: the first device sends the emergency information to the second device.

S204: the second device receives the emergency information based on the first information in the first control information.

In this embodiment of this application, the first device may indicate the second device to receive the emergency information by using the format-3, format-3A, format-6-0A, format-6-0B, format-6-1A, or format-6-1B control information. The format-3 control information and the format-3A control information are group control information, and are carried in Type0 common search space; and the format-6-0A control information, the format-6-0B control information, the format-6-1A control information, and the format-6-1B control information are user-specific messages, and are carried in user-specific search space. Therefore, the second device does not need to monitor Type2 search space when receiving the emergency information, so that user complexity is not increased, and user power consumption is reduced.

Compared with a manner, in an existing technology, of increasing bits in user-specific control information to indicate the emergency information, the control information, used in this embodiment of this application, in the foregoing formats does not need to indicate the emergency information by increasing additional bits. Therefore, an increase of control information overheads can be avoided, a decrease of spectral efficiency can further be avoided, and an increase of user power consumption can be avoided.

In addition, the format-3 control information and the format-3A control information are group control information, to be specific, the first device, such as a network device, may send indication information to a plurality of second devices, such as terminal devices, by using one piece of control information, thereby avoiding a waste of resources of the first device, and reducing power consumption of the first device.

In an example description, the first control information may be the format-3 or format-3A control information, K transmit power control command numbers (TPC command number) in the first control information are used to indicate the first information, and K is an integer greater than or equal to 1. The K TPC command numbers may not be assigned to any second device to transmit power control information, but are used to indicate the first information.

In addition, the first control information may alternatively include M TPC command numbers. The M TPC command numbers are used to indicate transmit power control commands of M second devices, or the M TPC command numbers are used to indicate transmit power control commands of H second devices, where M is an integer greater than or equal to 0, and H is an integer greater than M. In other words, the first control information may include K+M TPC command numbers, where the K TPC command numbers are used to indicate the first information, and the remaining M TPC command numbers are still used to indicate a transmit power control command. For example, one of the remaining M TPC command numbers may indicate a transmit power control command of one second device, or may indicate transmit power control commands of a plurality of second devices.

The TPC command number may also be referred to as a TPC command, and each TPC command includes two bits. For ease of description, the TPC command is used below.

The K TPC commands may be predefined. For example, the first device and the second device predefine a quantity, indexes, numbers, and the like of the K TPC commands. Alternatively, the K TPC commands are determined by the first device and are configured for the second device by using higher layer signaling. For example, the first device may configure the quantity, the indexes, the numbers, and the like of the K TPC commands by using system information or by using the higher layer signaling such as radio resource control (RRC) signaling or media access control control element (MAC CE) signaling.

An example in which K is equal to 1 is used below to specifically describe a case in which the TPC command indicates the first information. One TPC command includes two bits. Therefore, the TPC command includes four value states, which are "00", "01", "10", and "11". Any two of the four value states may be selected to respectively indicate the first information and third information. For example, 00 indicates the third information (without emergency information), and 01 indicates the first information (with emergency information), as shown in Table 1.

TABLE 1

| Value state | 00 | 01 | 10 | 11 |
|---|---|---|---|---|
| Meaning | Third information (without emergency information) | First information (with emergency information) | | |

Alternatively, any three of the four value states may be selected to respectively indicate the first information and the third information. For example, 00 indicates the third information (without emergency information); 01 indicates the first information (with emergency information), and the emergency information is an ETWS notification; and 10 indicates the first information (with emergency information), and the emergency information is a CMAS notification, as shown in Table 2.

TABLE 2

| Value state | 00 | 01 | 10 | 11 |
|---|---|---|---|---|
| Meaning | Third information (without emergency information) | First information (ETWS notification) | First information (CMAS notification) | |

Alternatively, the four value states may be used to respectively indicate the first information and the third information. For example, 00 indicates the third information (without emergency information); 01 indicates the first information (with emergency information), and the emergency information is an ETWS notification; 10 indicates the first information (with emergency information), and the emergency information is a CMAS notification; and 11 indicates the first information (with emergency information), and the emergency information is a system information modification notification, as shown in Table 3-1.

TABLE 3-1

| Value state | 00 | 01 | 10 | 11 |
|---|---|---|---|---|
| Meaning | Third information (without emergency information) | First information (ETWS notification) | First information (CMAS notification) | First information (system information modification notification) |

Alternatively, the first information and the third information may be indicated by using two bits. For example, one of the two bits is used to indicate an ETWS notification, and the other bit of the two bits is used to indicate a CMAS notification. 0 indicates that emergency information of this type does not exist, and 1 indicates that emergency information of this type exists. For example, the CMAS notification is indicated by using a high-order bit, and the ETWS notification is indicated by using a low-order bit, as shown in Table 3-2. In this case, 00 indicates the third information (without emergency information, that is, without any ETWS notification or CMAS notification); 01 indicates the first information (with emergency information), and the emergency information is an ETWS notification; 10 indicates the first information (with emergency information), and the emergency information is a CMAS notification; and 11 indicates the first information (with emergency information), and the emergency information is an ETWS notification and a CMAS notification, as shown in Table 3-3.

TABLE 3-2

| Bit | 1 (low-order bit) | 2 (high-order bit) |
|---|---|---|
| Meaning | ETWS notification | CMAS notification |

TABLE 3-3

| Value state | 00 | 01 | 10 | 11 |
|---|---|---|---|---|
| Meaning | Third information (without emergency information) | First information (ETWS notification) | First information (CMAS notification) | First information (ETWS notification and CMAS notification) |

An example in which K=2 is used for description. Two TPC commands include four bits, and three of the four bits may be used to indicate the first information and the third information. For example, the $1^{st}$ bit (the highest-order bit) in the three bits is used to indicate an ETWS notification, the $2^{nd}$ bit (the middle bit) in the three bits is used to indicate a CMAS notification, and the $3^{rd}$ bit (the lowest-order bit) in the three bits is used to indicate a system information modification, as shown in Table 3-4. 0 indicates that emergency information of this type does not exist, and 1 indicates that emergency information of this type exists. For example, 000 indicates the third information (without emergency information); 010 indicates the first information (with emergency information), and the emergency information is a CMAS notification; 100 indicates the first information (with emergency information), and the emergency information is an ETWS notification; 110 indicates the first information (with emergency information), and the emergency information is an ETWS notification and a CMAS notification; 111 indicates the first information (with emergency information), and the emergency information is an ETWS notification, a CMAS notification, and a system information modification notification; 001 indicates the first information (with emergency information), and the emergency information is a system information modification notification; 101 indicates the first information (with emergency information), and the emergency information is an ETWS notification and a system information modification notification; and 011 indicates the first information (with emergency information), and the emergency information is a CMAS notification and a system information modification notification, as shown in Table 3-5.

TABLE 3-4

| Bit | 1 (highest-order bit) | 2 (middle bit) | 3 (lowest-order bit) |
| --- | --- | --- | --- |
| Meaning | ETWS notification | CMAS notification | System information modification notification |

TABLE 3-5

| Meaning | Value state |
| --- | --- |
| Without emergency information | 000 |
| CMAS notification | 010 |
| ETWS notification | 100 |
| ETWS notification and CMAS notification | 110 |
| ETWS notification, CMAS notification, and system information modification notification | 111 |
| System information modification notification | 001 |
| ETWS notification and system information modification notification | 101 |
| CMAS notification and system information modification notification | 011 |

It should be understood that Table 1 to Table 3-5 are merely examples of descriptions, and do not specifically limit a type of the emergency information indicated by the first information, a value state corresponding to the first information, a value state corresponding to the third information, and the like. In addition, it should be understood that specific meanings corresponding to different bits or different states in the foregoing tables are not specifically limited. The content is protected by the embodiments of this application provided that a quantity of included bits and indicated content are the same as those in the method provided in the embodiments of this application.

In another example description, the first control information may be the format-3 or format-3A control information, Q bits, other than a TPC command, in the first control information are used to indicate the first information, and Q is an integer greater than or equal to 1. That is, the first control information includes Q bits and N TPC commands, the Q bits are used to indicate the first information, and the N TPC commands are used to indicate (or transmit) transmit power control information of a plurality of second devices. Alternatively, the first control information includes only Q bits. In this case, the first control information may be used to indicate an emergency information notification, but does not need to be used to indicate (or transmit) transmit power control information.

For example, Q may be equal to 1, and this bit has two value states, which are "0" and "1". Therefore, a value 0 of the increased bit Q may indicate the first information (with emergency information); and furthermore, a value 1 of the bit Q may indicate the third information (without emergency information). Alternatively, when a value of the increased bit is 1, the first information (with emergency information) may be indicated; and furthermore, when the value of the bit is 0, the third information (without emergency information) may further be indicated.

For another example, Q may alternatively be equal to 2, and the two bits have four value states, which are "00", "01", "10", and "11". Therefore, the first information and the third information may be indicated by using the increased two bits. For details of a manner of indicating the first information by using the increased two bits, refer to a manner of indicating the first information by using different value states of the TPC command, as shown in Table 1 to Table 3-1. Details are not described herein again. Alternatively, when the two bits indicate the first information and the third information, the two bits may specifically indicate emergency information of two types respectively. For details of a manner of indicating emergency information of two types by using two bits, refer to a manner of indicating emergency information of two types by using two bits of the TPC command, as shown in Table 3-2 and Table 3-3. Details are not described herein again.

For another example, Q may alternatively be equal to 3. When the three bits indicate the first information and the third information, the three bits may specifically indicate emergency information of three types respectively. For details of a manner of indicating emergency information of three types by using three bits, refer to a manner of indicating emergency information of three types by using three bits of the TPC command, as shown in Table 3-4 and Table 3-5. Details are not described herein again.

During specific implementation, before sending the first control information to the second device, the first device may further determine second information, where the second information is used to indicate that the first control information includes the first information; and send the second information to the second device. Therefore, after receiving the second information, the second device may obtain the first information from the first control information.

In still another example description, the first control information may alternatively be the format-6-1A or format-6-1B control information; and when all bits of a resource block assignment field of the first control information are set to 1, a first field of the first control information may be used to indicate the first information.

During specific implementation, the first field may be a physical random access channel mask index (PRACH Mask index) field.

In an example, in a frequency division duplex (FDD) system, when a value of the first field is 13, 14, or 15, it may indicate that emergency information exists. Alternatively, any two value states may be selected from value states 13, 14, and 15 of the first field to respectively indicate two emergency information notifications, where the two emergency information notifications may be any two of an ETWS notification, a CMAS notification, and a system info modification notification. For example, 13 indicates the ETWS notification, and 14 indicates the CMAS notification. Alternatively, three value states 13, 14, and 15 of the first field may respectively indicate three emergency information notifications, where the three emergency information notifications may be an ETWS notification, a CMAS notification, and a system info modification notification. For example, 13 indicates the ETWS notification, 14 indicates the CMAS notification, and 15 indicates the system info modification notification, as shown in Table 4.

In another example, in time division duplex, when a value of the first field is 7, 8, or 9, it may indicate that emergency information exists. Alternatively, any two value states may be selected from value states 7, 8, and 9 of the first field to respectively indicate two emergency information notifications, where the two emergency information notifications may be any two of an ETWS notification, a CMAS notification, and a system info modification notification. For example, 7 indicates the ETWS notification, and 8 indicates the CMAS notification. Alternatively, three value states 7, 8, and 9 of the first field may respectively indicate three emergency information notifications, where the three emergency information notifications may be an ETWS notification, a CMAS notification, and a system info modification notification. For example, 7 indicates the ETWS notification, 8 indicates the CMAS notification, and 9 indicates the system info modification notification, as shown in Table 4.

TABLE 4

| PRACH mask index | FDD | TDD |
|---|---|---|
| 7 | | ETWS |
| 8 | | CMAS |
| 9 | | System information modification |
| 13 | ETWS | |
| 14 | CMAS | |
| 15 | System information modification | |

In another example description, the first control information may be the format-6-0B control information; and when all bits of an MCS field of the first control information are set to 1, a second field of the first control information is used to indicate the first information.

During specific implementation, the second field may be any field, other than the MCS field and a flag for uplink and downlink differentiation (Flag for format 6-0B/format 6-1B differentiation), in the first control information.

In some embodiments, the second field may indicate the first information by using different states. Specifically, the second field may indicate the first information by using a first status, and the first status may include one or more states. If the first status includes one state, the state may indicate the first information (with emergency information). If the first status includes two states, the two states may respectively indicate emergency information notifications of two types. If the first status includes three states, the three states may respectively indicate emergency information notifications of three types. Each state of the first status may include at least one bit whose value is 1.

An example in which the first field is a repetition number field is used below. The repetition number field may indicate the first information by using one value state. For example, when a value of the repetition number field is 111, the first information (with emergency information) is indicated. The repetition number field may alternatively indicate the first information by using two value states. For example, when a value of the repetition number field is 111, the first information (with emergency information) is indicated, and the emergency information is ETWS information; and when the value of the repetition number field is 110, the first information (with emergency information) is indicated, and the emergency information is CMAS information. The repetition number field may alternatively indicate the first information by using three value states. For example, when a value of the repetition number field is 111, the first information (with emergency information) is indicated, and the emergency information is ETWS information; and when the value of the repetition number field is 110, the first information (with emergency information) is indicated, and the emergency information is CMAS information; and when the value of the repetition number field is 100, the first information (with emergency information) is indicated, and the emergency information is system info modification information. It should be noted that the foregoing is merely an example description, and no specific limitation is imposed on a type of the first field, a quantity of states included in the first status, a type of the emergency information, a value state corresponding to each type of emergency information, and the like.

In some other embodiments, the second field may indicate the first information by using different bits. For details of a manner of indicating the first information by using different bits of the second field, refer to a manner of indicating emergency information of two types by using different bits of a TPC command. For example, for details of a manner of respectively indicating emergency information of two types by using two bits of the second field, refer to a manner of indicating emergency information of two types by using two bits of the TPC command, as shown in Table 3-2 and Table 3-3. Details are not described herein again. For details of a manner of indicating emergency information of three types by using three bits of the second field, refer to a manner of indicating emergency information of three types by using three bits of the TPC command, as shown in Table 3-4 and Table 3-5. Details are not described herein again.

In yet another example description, the first control information may be the format-6-0A control information; and when all bits of a resource block assignment field of the first control information are set to 1, a third field of the first control information is used to indicate the first information.

During specific implementation, the third field may be any field, other than the resource block assignment field and a field for uplink and downlink differentiation (Flag for format 6-0A/format 6-1A differentiation), in the first control information.

In some embodiments, the third field may indicate the first information by using different states. Specifically, the third field may indicate the first information by using a first status, and the first status may include one or more states. If the first status includes one state, the state may indicate the first information (with emergency information). If the first status includes two states, the two states may respectively indicate emergency information of two types. If the first status includes three states, the three states may respectively indicate emergency information of three types. Each state of the first status may include at least one bit whose value is 1.

An example in which the third field is a modulation and coding scheme (MCS) field is used below. The MCS field may indicate the first information by using one value state. For example, when a value of the MCS field is 111, the first information (with emergency information) is indicated. The MCS field may alternatively indicate the first information by using two value states. For example, when a value of the MCS field is 111, the first information (with emergency information) is indicated, and the emergency information is ETWS information; and when the value of the MCS field is 110, the first information (with emergency information) is indicated, and the emergency information is CMAS information. The MCS field may alternatively indicate the first information by using three value states. For example, when a value of the MCS field is 111, the first information (with emergency information) is indicated, and the emergency information is ETWS information; and when the value of the MCS field is 110, the first information (with emergency information) is indicated, and the emergency information is CMAS information; and when the value of the MCS field is 100, the first information (with emergency information) is indicated, and the emergency information is system info modification information. It should be noted that the foregoing is merely an example description, and no specific limitation is imposed on a type of the first field, a quantity of states included in the first status, a type of the emergency information, a value state corresponding to each type of emergency information, and the like.

In some other embodiments, the third field may indicate the first information by using different bits. For details of a manner of indicating the first information by using different bits of the third field, refer to a manner of indicating emergency information of two types by using different bits of a TPC command. For example, for details of a manner of respectively indicating emergency information of two types by using two bits of the third field, refer to a manner of indicating emergency information of two types by using two bits of the TPC command, as shown in Table 3-2 and Table 3-3. Details are not described herein again. For details of a manner of indicating emergency information of three types by using three bits of the third field, refer to a manner of indicating emergency information of three types by using three bits of the TPC command, as shown in Table 3-4 and Table 3-5. Details are not described herein again.

In a possible implementation, in the foregoing several examples of descriptions, a cyclic redundancy check (CRC) code of the first control information may be scrambled by a first scrambling code, where the first scrambling code may be a system information radio network temporary identifier (SI-RNTI).

In an example description, when the CRC code of the first control information is scrambled by a second scrambling code, the first control information may include only an emergency information notification, the first control information includes an emergency information notification, or the first control information is used to indicate or transmit the first information, where the second scrambling code may be an SI-RNTI. Optionally, in this case, all remaining bits in the first control information are set to a first status. For example, all remaining bits are set to 1 or all remaining bits are set to 0. In this way, whether DCI is correct can be further detected by using the first status, thereby reducing a false alarm probability.

In another example description, when the CRC code of the first control information is scrambled by an SI-RNTI, a fourth field of the first control information may be used to indicate the first information, and the fourth field may be any field in the first control information.

Figure 3:
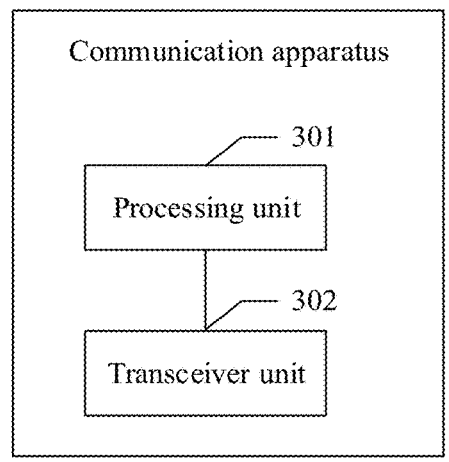
FIG. 3 is a schematic structural diagram of a communication apparatus according to an embodiment of this application.

Based on a same inventive concept as the method embodiment, an embodiment of this application provides a communication apparatus. A structure of the communication apparatus may be shown in FIG. 3, and includes a processing unit 301 and a transceiver unit 302.

In a specific implementation, the apparatus is specifically configured to implement a function of the first device in the embodiment in FIG. 2. The apparatus may be the first device itself, or may be a chip or a chipset in the first device, or a part of a chip used to perform a function of a related method. Specifically, the processing unit 301 is configured to determine first control information, where the first control information carries first information, and the first information is used to indicate emergency information; and the first control information is format-3 control information, format-3A control information, format-6-0A control information, format-6-0B control information, format-6-1A control information, or format-6-1B control information. The transceiver unit 302 is configured to: send the first control information determined by the processing unit 301 to a second device, and send the emergency information to the second device.

The emergency information may include one or more pieces of the following information: an ETWS notification, a CMAS notification, and a system information modification notification.

In an example description, the first control information is the format-3 or format-3A control information, K TPC command numbers in the first control information may be used to indicate the first information, and K is an integer greater than or equal to 1.

The K TPC command numbers may be predefined, or the K TPC command numbers may be determined by the first device and are configured for the second device by using higher layer signaling.

In another example description, the first control information is the format-3 or format-3A control information, Q bits, other than a TPC command number, in the first control information may be used to indicate the first information, and Q is an integer greater than or equal to 1.

In an implementation, the processing unit 301 may further be configured to: before the transceiver unit 302 sends the first control information to the second device, determine second information, where the second information is used to indicate that the first control information includes the first information. The transceiver unit 302 may further be configured to send the second information determined by the processing unit 301 to the second device.

In still another example description, the first control information is the format-6-1A or format-6-1B control information; and when all bits of a resource block assignment field of the first control information are set to 1, a first field of the first control information may be used to indicate the first information.

In yet another example description, the first field may be a PRACH mask index field.

In a still further example description, the first control information is the format-6-0B control information; and when all bits of a modulation and coding scheme field of the first control information are set to 1, a second field of the first control information may be used to indicate the first information; or the first control information is the format-6-0A control information; and when all bits of a resource block assignment field of the first control information are set to 1, a third field of the first control information may be used to indicate the first information.

In some embodiments, a CRC code of the first control information is scrambled by an SI-RNTI.

In another specific implementation, the apparatus is specifically configured to implement a function of the second device in the embodiment in FIG. 2. The apparatus may be the second device itself, or may be a chip or a chipset in the second device, or a part of a chip used to perform a function of a related method. Specifically, the transceiver unit 302 is configured to receive data; and the processing unit 301 is configured to: control the transceiver unit 302 to receive first control information sent by a first device, where the first control information carries first information, and the first information is used to indicate emergency information; and the first control information is format-3 control information, format-3A control information, format-6-0A control information, format-6-0B control information, format-6-1A control information, or format-6-1B control information; and control, based on the first information in the first control information, the transceiver unit 302 to receive the emergency information.

The emergency information may include one or more pieces of the following information: an ETWS notification, a CMAS notification, and a system information modification notification.

In an example description, the first control information is the format-3 or format-3A control information, K TPC command numbers in the first control information may be used to indicate the first information, and K is an integer greater than or equal to 1.

The K TPC command numbers may be predefined, or the K TPC command numbers may be determined by the second device by receiving higher layer signaling sent by the first device.

In still another example description, the first control information is the format-3 or format-3A control information, Q bits in the first control information may be used to indicate the first information, and Q is an integer greater than or equal to 1.

In an implementation, the processing unit 301 may further be configured to: before controlling the transceiver unit 302 to receive the first control information sent by the first device, control the transceiver unit 302 to receive second information sent by the first device, where the second information is used to indicate that the first control information includes the first information.

In yet another example description, the first control information is the format-6-1A or format-6-1B control information; and when all bits of a resource block assignment field of the first control information are set to 1, a first field of the first control information may be used to indicate the first information.

Further, the first field may be a PRACH mask index field.

In another example description, the first control information is the format-6-0B control information; and when all bits of a modulation and coding scheme field of the first control information are set to 1, a second field of the first control information may be used to indicate the first information; or the first control information is the format-6-0A control information; and when all bits of a resource block assignment field of the first control information are set to 1, a third field of the first control information may be used to indicate the first information.

In some embodiments, a CRC code of the first control information is scrambled by an SI-RNTI.

This application provides another communication method. The method may be applied to the terminal device in the communication system shown in FIG. 1.

In a communication system, one piece of downlink control information (DCI) schedules one transport block (TB) or a plurality of transport blocks. When the DCI schedules one TB, the DCI also indicates one hybrid automatic retransmission request (HARQ) process number. For example, if user equipment (UE) supports eight HARQ processes, the DCI indicates, in 0 to 7 by using three bits, a HARQ process number used for the TB scheduled by the DCI. When the DCI schedules one TB, the DCI also indicates whether data scheduled by the DCI is a newly transmitted TB or a retransmitted TB.

To reduce DCI transmission overheads and save a transmission resource, one piece of DCI may be used to schedule a plurality of TBs. When one piece of DCI schedules a plurality of transport blocks, the DCI may indicate a plurality of HARQ process numbers, and each HARQ process number corresponds to or is associated with transmission of one transport block.

To further reduce overheads when one piece of DCI schedules a plurality of transport blocks, it needs to be restricted that HARQ process numbers used for the plurality of transport blocks are consecutive, and the $1^{st}$ HARQ process number in the plurality of HARQ process numbers needs to be constant. For example, if one piece of DCI schedules N transport blocks, and a HARQ process number of the first transport block in the N transport blocks is constant, for example, is always 0, HARQ process numbers of remaining N−1 transport blocks in the N transport blocks are 1, 2, . . . , and N−1.

When the DCI is capable of scheduling a maximum of N transport blocks, N bits need to indicate new data indicator (NDI) information of each transport block in a bitmap manner. The N bits further need to indicate, in a bitmap manner, whether the HARQ process number of each transport block is used. Therefore, a total of 2N bits are required to indicate a quantity of scheduled transport blocks and the NDI information of each transport block. Therefore, when a control channel indicates a quantity of transport blocks and NDI information of each transport block, there is a problem that overheads are excessively large.

In an exemplary embodiment, the present application provides an information processing method, including:
  receiving, by a terminal device, downlink control information from a network device, wherein the downlink control information is capable of scheduling a maximum of N transport blocks TBs, and N is a positive integer;
  determining, by the terminal device, that a first field comprises (N+2) bits $b_0, b_1, \ldots,$ and $b_{N+1}$ when the downlink control information comprises the first field;
  determining, by the terminal device based on the first field, a quantity L of TBs scheduled by the downlink control information, wherein L is a positive integer, wherein
  when L is greater than 1, the L TBs scheduled by the downlink control information comprise both a newly transmitted TB and a retransmitted TB;
  in j consecutive bits $b_k, b_{k+1}, \ldots,$ and $b_{k+j-1}$ in the first field, a bit state of only one bit is 1, and bit states of other j−1 bits are all 0, j is a positive integer, j=N+1−L, k is a pre-specified integer, and k=0 or k=L+1; and
  if k=0, a bit state of a bit $b_j$ in the first field is 1, and L consecutive bits $b_{j+1}, b_{j+2}, \ldots,$ and $b_{N+1}$ in the first field carry new data indicator NDI information of the L TBs scheduled by the downlink control information; or
  if k=L+1, a bit state of a bit $b_L$ in the first field is 1, and L consecutive bits $b_0, b_1, \ldots,$ and $b_{L-1}$ in the first field carry NDI information of the L TBs scheduled by the downlink control information;
  determining, by the terminal device, a HARQ process number of each of the L TBs; and
  sending or receiving, by the terminal device, the L TBs based on the determined HARQ process number of each of the L TBs and the NDI information of each of the L TBs.

In a further embodiment, L, a HARQ process number of a first TB in the L TBs, and the NDI information of each of the L TBs are determined based on a correspondence between bit states of the first field and the quantity of TBs, the HARQ process number of the first TB, and the NDI information of the L TBs, and the first TB is one of the L TBs.

In a further embodiment, the determining, by the terminal device, a HARQ process number of each of the L TBs includes:
  using, by the terminal device, a bit $b_0$ as a start bit; determining that a bit $b_i$ is the $1^{st}$ bit whose bit state is 1 in the (N+2) bits, wherein a HARQ process number of a first TB is i; and determining, by the terminal device, a HARQ process number of another TB, other than the first TB, in the L TBs based on the HARQ process number of the first TB and a first association relationship between process numbers of L HARQ processes, wherein the first TB is one of the L TBs, and the L HARQ processes are HARQ processes corresponding to the L TBs; or
  using, by the terminal device, a bit $b_{L+1}$ as a start bit; determining that a bit $b_i$ is the $1^{st}$ bit whose bit state is 1 in the (N+2) bits, wherein a HARQ process number of a first TB is i−L−1; and determining, by the terminal device, a HARQ process number of another TB, other than the first TB, in the L TBs based on the HARQ process number of the first TB and a first association relationship between process numbers of L HARQ processes, wherein the first TB is one of the L TBs, and the L HARQ processes are HARQ processes corresponding to the L TBs.

In a further embodiment, the method further includes:
  using, by the terminal device, a bit $b_0$ as a start bit, and determining that a bit $b_m$ is the $2^{nd}$ bit whose bit state is 1 in the (N+2) bits, wherein j=m, and L=N+1−m; or
  using, by the terminal device, a bit $b_{N+1}$ as a start bit, and determining that a bit $b_m$ is the $2^{nd}$ bit whose bit state is 1 in the (N+2) bits from right to left, wherein j=N+1−m, and L=m.

5. The method according to claim 1, 3, or 4, wherein the NDI information of each of the L TBs is determined based on the L bits $b_{j+1}, b_{j+2}, \ldots,$ and $b_{N+1}$ in a bitmap manner; or
  the NDI information of each of the L TBs is determined based on the L bits $b_0, b_1, \ldots,$ and $b_{L-1}$ in a bitmap manner.

In a further embodiment, the method further includes:
determining, by the terminal device based on a first bit in the downlink control information, whether the downlink control information comprises the first field, wherein the first bit is one bit; and
if a bit state of the first bit is 1, determining, by the terminal device, that the downlink control information comprises the first field, wherein N is a positive integer greater than 1.

In a further embodiment, the method further includes:
determining, by the terminal device based on a first bit in the downlink control information, whether the downlink control information comprises the first field, wherein the first bit is one bit; and
if a bit state of the first bit is 0, determining, by the terminal device, that the downlink control information does not comprise the first field;
determining, by the terminal device, that the downlink control information comprises a second bit, wherein the second bit is one bit;
if a bit state of the second bit is 1, determining, by the terminal device, that the downlink control information is capable of scheduling a maximum of N TBs, wherein N is a positive integer greater than 1, and all TBs scheduled by the downlink control information are newly transmitted TBs, or all TBs scheduled by the downlink control information are retransmitted TBs;
if a bit state of the second bit is 1, determining, by the terminal device, that the downlink control information is capable of scheduling a maximum of N TBs, wherein N is a positive integer greater than 1, the downlink control information comprises a second field and/or a third field, the second field is used to indicate HARQ process numbers of the maximum of N TBs and/or first identification information, and the third field is used to indicate second identification information; or
if a bit state of the second bit is 0, determining, by the terminal device, that the downlink control information is capable of scheduling only one TB;
if a bit state of the second bit is 0, determining, by the terminal device, that the downlink control information is capable of scheduling only one or two TBs, wherein the downlink control information comprises a fourth field and/or a fifth field, the fourth field is used to indicate a HARQ process number and/or NDI information, and the fifth field is used to indicate a redundancy version (RV); or
if a bit state of the second bit is 0, determining, by the terminal device, that the downlink control information is capable of scheduling only a maximum of two TBs, the downlink control information comprises a third field and/or a fourth field, the third field is used to indicate a HARQ process number and/or NDI information, and the fourth field is used to indicate a redundancy version (RV).

In a further embodiment, the method further includes:
determining, by the terminal device based on a first bit in the downlink control information, whether the downlink control information comprises the first field, wherein the first bit is one bit;
if a bit state of the first bit is 0, determining, by the terminal device, that the downlink control information does not comprise the first field;
determining, by the terminal device, that the downlink control information comprises a second bit, wherein the second bit is one bit;
if a bit state of the second bit is 1, determining, by the terminal device, that the downlink control information is capable of scheduling a maximum of N TBs, wherein N is a positive integer greater than 1, and all TBs scheduled by the downlink control information are newly transmitted TBs, or all TBs scheduled by the downlink control information are retransmitted TBs;
if a bit state of the second bit is 1, determining, by the terminal device, that the downlink control information is capable of scheduling a maximum of N TBs, wherein N is a positive integer greater than 1, the downlink control information comprises a second field and/or a third field, the second field is used to indicate HARQ process numbers of the maximum of N TBs and/or first identification information, and the third field is used to indicate second identification information; and determining, by the terminal device based on the second field, the quantity L of TBs scheduled by the downlink control information, wherein L is a positive integer, and L≤N; or if a bit state of the second bit is 0, determining, by the terminal device, that the downlink control information further comprises a third bit, wherein the third bit is one bit, and a bit state of the third bit is always 1; and determining, by the terminal device based on the third bit, that the downlink control information is capable of scheduling only one or two TBs.

In an exemplary embodiment, the present application provides an information processing method, including:

determining, by a network device, a quantity L of transport blocks TBs scheduled by downlink control information, wherein the downlink control information is capable of scheduling a maximum of N TBs, N is positive integer, L is a positive integer;

determining, by the network device, HARQ process numbers of the L TBs;

determining, by the network device, new data indicator NDI information of the L TBs;

sending, by the network device, the downlink control information to a terminal device, wherein the downlink control information is capable of scheduling both a newly transmitted TB and a retransmitted TB, the downlink control information comprises a first field, and the first field comprises (N+2) bits $b_0$, $b_1$, ..., and $b_{N+1}$, wherein in j consecutive bits $b_k$, $b_{k+1}$, ..., and $b_{k+j-1}$ in the first field, a bit state of only one bit is 1, and bit states of other j–1 bits are all 0, j is a positive integer, j=N+1–L, k is a pre-specified integer, and k=0 or k=L+1; and if k=0, a bit state of a bit $b_i$ in the first field is 1, and L consecutive bits $b_{j+1}$, $b_{j+2}$, ..., and $b_{N+1}$ in the first field carry NDI information of the L TBs scheduled by the downlink control information; or if k=L+1, a bit state of a bit $b_L$ in the first field is 1, and L consecutive bits $b_0$, $b_1$, ..., and $b_{L-1}$ in the first field carry NDI information of the L TBs scheduled by the downlink control information; and sending or receiving, by the network device, the L TBs based on the downlink control information.

In a further embodiment, the method further includes:

determining, by the network device, one or more bit states of the first field based on a correspondence between bit states of the first field, and L, a HARQ process number of a first TB in the L TBs, and NDI information of each of the L TBs, wherein the first TB is one of the L TBs.

In a further embodiment, the method further includes:

if k=0, determining, by the network device, that the HARQ process number of the first TB is i, wherein the first TB is the $1^{st}$ TB in the L TBs; using, by the network device, a bit $b_0$ as a start bit; and determining, by the network device, that a bit state of a bit $b_i$ in the first field is 1 and bit states of other j–1 bits, other than the bit $b_i$, in $b_0$, $b_1$, ..., and $b_{j-1}$ are all 0; or if k=L+1, determining, by the network device, that the HARQ process number of the first TB is i–L–1, wherein the first TB is the $1^{st}$ TB in the L TBs; using, by the network device, a bit $b_{L+1}$ as a start bit; determining, by the network device, that a bit state of a bit $b_i$ in the first field is 1; and determining, by the network device, that bit states of other j–1 bits, other than the bit $b_i$, in $b_{L+1}$, $b_{L+2}$, ..., and $b_{N+1}$ are all 0.

In a further embodiment, the method further includes:

if k=0, determining, by the network device, that a bit state of a bit $b_{N+1-L}$ in the first field is 1; or if k=L+1, determining, by the network device, that a bit state of a bit $b_L$ in the first field is 1.

In a further embodiment, the method further includes:

indicating, by the network device, the NDI information of each of the L TBs by using L bits in a bitmap manner, wherein the L bits are $b_{j+1}$, $b_{j+2}$, ..., and $b_{N+1}$ in the first field; or indicating, by the network device, the NDI information of each of the L TBs by using L bits in a bitmap manner, wherein the L bits are $b_0$, $b_1$, ..., and $b_{L-1}$ in the first field.

In a further embodiment, the method further includes:

when the network device determines that the downlink control information is capable of scheduling both a newly transmitted TB and a retransmitted TB, determining, by the network device, that the downlink control information comprises the first field; and setting, by the network device, a bit state of a first bit in the downlink control information to 1, wherein the first bit is one bit.

In a further embodiment, the method further includes:

when the network device determines that all TBs that the downlink control information is capable of scheduling can only be newly transmitted TBs, or when the network device determines that all TBs that the downlink control information is capable of scheduling can only be retransmitted TBs, determining, by the network device, that the downlink control information does not comprise the first field; or when the network device determines that the downlink control information comprises a second field and/or a third field, determining, by the network device, that the downlink control information does not comprise the first field; and setting, by the network device, a bit state of a first bit in the downlink control information to 0, wherein the first bit is one bit.

In a further embodiment, the method further includes:

when the downlink control information schedules a plurality of newly transmitted TBs or a plurality of retransmitted TBs, setting, by the network device, a bit state of a second bit in the downlink control information to 1;

when the downlink control information comprises the second field and/or the third field, setting, by the network device, a bit state of a second bit in the downlink control information to 1; or when the downlink control information is capable of scheduling only one or two TBs, setting, by the network device, a bit state of a second bit in the downlink control information to 0, wherein the second bit is one bit.

In a further embodiment, the method further includes:

when the downlink control information schedules a plurality of newly transmitted TBs or a plurality of retransmitted TBs, setting, by the network device, a bit state of a second bit in the downlink control information to 1, wherein the second bit is one bit; or when the downlink control information comprises the second field and/or the third field, setting, by the network device, a bit state of a second bit in the downlink control information to 1, wherein the second bit is one bit; and when the downlink control information is capable of scheduling only one or two TBs, determining, by the network device, that the downlink control information further comprises a third bit, wherein the third bit is one bit; and setting, by the network device, a bit state of the third bit to 0.

In an exemplary embodiment, the present application provides a terminal device, comprising a processing module and a transceiver module, wherein the transceiver module is configured to receive downlink control information from a network device, wherein the downlink control information is capable of scheduling a maximum of N transport blocks TBs, and N is a positive integer;

the processing module is configured to: determine that a first field comprises (N+2) bits $b_0, b_1, \ldots,$ and $b_{N+1}$ when the downlink control information comprises the first field; and determine, based on the first field, a quantity L of TBs scheduled by the downlink control information, wherein L is a positive integer, wherein when L is greater than 1, the L TBs scheduled by the downlink control information comprise both a newly transmitted TB and a retransmitted TB;

in j consecutive bits $b_k, b_{k+1}, \ldots,$ and $b_{k+j-1}$ in the first field, a bit state of only one bit is 1, and bit states of other j−1 bits are all 0, j is a positive integer, j=N+1−L, k is a pre-specified integer, and k=0 or k=L+1; and if k=0, a bit state of a bit $b_j$ in the first field is 1, and L consecutive bits $b_{j+1}, b_{j+2}, \ldots,$ and $b_{N+1}$ in the first field carry new data indicator NDI information of the L TBs scheduled by the downlink control information; or if k=L+1, a bit state of a bit $b_L$ in the first field is 1, and L consecutive bits $b_0, b_1, \ldots,$ and $b_{L-1}$ in the first field carry NDI information of the L TBs scheduled by the downlink control information;

the processing module is configured to determine a HARQ process number of each of the L TBs; and the transceiver module is configured to send or receive the L TBs based on the determined HARQ process number of each of the L TBs and the NDI information of each of the L TBs.

In a further embodiment, L, a HARQ process number of a first TB in the L TBs, and the NDI information of each of the L TBs are determined based on a correspondence between bit states of the first field and the quantity of TBs, the HARQ process number of the first TB, and the NDI information of the L TBs, and the first TB is one of the L TBs.

In a further embodiment, the processing module is configured to: use a bit $b_0$ as a start bit; determine that a bit $b_i$ is the 1$^{st}$ bit whose bit state is 1 in the (N+2) bits, wherein a HARQ process number of a first TB is i; and determine a HARQ process number of another TB, other than the first TB, in the L TBs based on the HARQ process number of the first TB and a first association relationship between process numbers of L HARQ processes, wherein the first TB is one of the L TBs, and the L HARQ processes are HARQ processes corresponding to the L TBs; or use a bit $b_{L+1}$ as a start bit; determine that a bit $b_i$ is the Pt bit whose bit state is 1 in the (N+2) bits, wherein a HARQ process number of a first TB is i−L−1; and determine a HARQ process number of another TB, other than the first TB, in the L TBs based on the HARQ process number of the first TB and a first association relationship between process numbers of L HARQ processes, wherein the first TB is one of the L TBs, and the L HARQ processes are HARQ processes corresponding to the L TBs.

In a further embodiment, the processing module is configured to: use a bit $b_0$ as a start bit, and determine that a bit $b_m$ is the 2$^{nd}$ bit whose bit state is 1 in the (N+2) bits, wherein j=m, and L=N+1−m; or the processing module is configured to: use a bit $b_{N+1}$ as a start bit, and determine that a bit $b_m$ is the 2$^{nd}$ bit whose bit state is 1 in the (N+2) bits from right to left, wherein j=N+1−m, and L=m.

In a further embodiment, the NDI information of each of the L TBs is determined based on the L bits $b_{j+1}, b_{j+2}, \ldots,$ and $b_{N+1}$ in a bitmap manner; or the NDI information of each of the L TBs is determined based on the L bits $b_0, b_1, \ldots,$ and $b_{L-1}$ in a bitmap manner.

In a further embodiment, the processing module is configured to: determine, based on a first bit in the downlink control information, whether the downlink control information comprises the first field, wherein the first bit is one bit; and if a bit state of the first bit is 1, determine that the downlink control information comprises the first field, wherein N is a positive integer greater than 1.

In a further embodiment, the processing module is configured to: determine, based on a first bit in the downlink control information, whether the downlink control information comprises the first field, wherein the first bit is one bit; and if a bit state of the first bit is 0, determine that the downlink control information does not comprise the first field;

determine that the downlink control information comprises a second bit, wherein the second bit is one bit;

if a bit state of the second bit is 1, determine that the downlink control information is capable of scheduling a maximum of N TBs, wherein N is a positive integer greater than 1, and all TBs scheduled by the downlink control information are newly transmitted TBs, or all TBs scheduled by the downlink control information are retransmitted TBs;

if a bit state of the second bit is 1, determine that the downlink control information is capable of scheduling a maximum of N TBs, wherein N is a positive integer greater than 1, the downlink control information comprises a second field and/or a third field, the second field is used to indicate HARQ process numbers of the maximum of N TBs and/or first identification information, and the third field is used to indicate second identification information;

if a bit state of the second bit is 0, determine that the downlink control information is capable of scheduling only one or two TBs, wherein the downlink control information comprises a fourth field and/or a fifth field, the fourth field is used to indicate a HARQ process number and/or NDI information, and the fifth field is used to indicate a redundancy version (RV); or if a bit state of the second bit is 0, determine that the downlink control information is capable of scheduling only one or two TBs.

In a further embodiment, the processing module is configured to: determine, based on a first bit in the downlink control information, whether the downlink control information comprises the first field, wherein the first bit is one bit; and if a bit state of the first bit is 0, determine that the downlink control information does not comprise the first field; and determine that the downlink control information comprises a second bit, wherein the second bit is one bit; or if a bit state of the second bit is 1, determine that the downlink control information is capable of scheduling a maximum of N TBs, wherein N is a positive integer greater than 1, and all TBs scheduled by the downlink control information are newly transmitted TBs, or all TBs scheduled by the downlink control information are retransmitted TBs;

if a bit state of the second bit is 0, determine that the downlink control information further comprises a third bit, wherein the third bit is one bit, and a bit state of the third bit is always 1; and determine, based on the third bit, that the downlink control information is capable of scheduling only one TB.

In an exemplary embodiment, the present application provides a network device, including a processing module and a transceiver module, wherein
  the processing module is configured to determine a quantity L of transport blocks TBs scheduled by downlink control information, wherein the downlink control information is capable of scheduling a maximum of N TBs, N is positive integer, L is a positive integer;
  the processing module is configured to determine HARQ process numbers of the L TBs;
  the processing module is configured to determine new data indicator NDI information of the L TBs;
  the transceiver module is configured to send the downlink control information to a terminal device, wherein the downlink control information is capable of scheduling both a newly transmitted TB and a retransmitted TB, the downlink control information comprises a first field, and the first field comprises (N+2) bits $b_0$, $b_1$, ..., and $b_{N+1}$, wherein
    in j consecutive bits $b_k$, $b_{k+1}$, ..., and $b_{k+j-1}$ in the first field, a state of only one bit is 1, and states of other j−1 bits are all 0, j is a positive integer, j=N+1−L, k is a pre-specified integer, and k=0 or k=L+1; and
    if k=0, a bit state of a bit $b_j$ in the first field is 1, and L consecutive bits $b_{j+1}$, $b_{j+2}$, ..., and $b_{N+1}$ in the first field carry NDI information of the L TBs scheduled by the downlink control information; or
    if k=L+1, a bit state of a bit $b_L$ in the first field is 1, and L consecutive bits $b_0$, $b_1$, ..., and $b_{L-1}$ in the first field carry NDI information of the L TBs scheduled by the downlink control information; and
  the transceiver module is configured to send or receive the L TBs based on the downlink control information.

In a further embodiment, the processing module is configured to determine one or more bit states of the first field based on a correspondence between bit states of the first field, and L, a HARQ process number of a first TB in the L TBs, and NDI information of each of the L TBs, wherein the first TB is one of the L TBs.

In a further embodiment, the processing module is configured to: if k=0, determine that the HARQ process number of the first TB is i, wherein the first TB is the $1^{st}$ TB in the L TBs; use a bit $b_0$ as a start bit; and determine that a bit state of a bit $b_i$ in the first field is 1 and bit states of other j−1 bits, other than the bit $b_i$, in $b_0$, $b_1$, ..., and $b_{j-1}$ are all 0; or if k=L+1, determine that the HARQ process number of the first TB is i−L−1, wherein the first TB is the $1^{st}$ TB in the L TBs; use a bit $b_{L+1}$ as a start bit; determine that a bit state of a bit $b_i$ in the first field is 1; and determine that bit states of other j−1 bits, other than the bit $b_i$, in $b_{L+1}$, $b_{L+2}$, ..., and $b_{N+1}$ are all 0.

In a further embodiment, the processing module is configured to: if k=0, determine that a bit state of a bit $b_{N+1-L}$ in the first field is 1; or if k=L+1, determine that a bit state of a bit $b_L$ in the first field is 1.

In a further embodiment, the processing module is configured to: indicate the NDI information of each of the L TBs by using L bits in a bitmap manner, wherein the L bits are $b_{j+1}$, $b_{j+2}$, ..., and $b_{N+1}$ in the first field; or indicate the NDI information of each of the L TBs by using L bits in a bitmap manner, wherein the L bits are $b_0$, $b_1$, ..., and $b_{L-1}$ in the first field.

In a further embodiment, the processing module is configured to: when determining that the downlink control information is capable of scheduling both a newly transmitted TB and a retransmitted TB, determine that the downlink control information comprises the first field, and set a bit state of a first bit in the downlink control information to 1, wherein the first bit is one bit.

In a further embodiment, the processing module is configured to: when determining that all TBs that the downlink control information is capable of scheduling can only be newly transmitted TBs, when determining that all TBs that the downlink control information is capable of scheduling are retransmitted TBs, or when determining that the downlink control information comprises a second field and/or a third field, determine that the downlink control information does not comprise the first field; and set a bit state of a first bit in the downlink control information to 0, wherein the first bit is one bit.

In a further embodiment, the processing module is configured to: when the downlink control information schedules a plurality of newly transmitted TBs, when the downlink control information schedules a plurality of retransmitted TBs, or when determining that the downlink control information comprises the second field and/or the third field, set a bit state of a second bit in the downlink control information to 1; or when the downlink control information is capable of scheduling only one or two TBs, set a bit state of a second bit in the downlink control information to 0, wherein the second bit is one bit.

In a further embodiment, the processing module is configured to: when the downlink control information schedules a plurality of newly transmitted TBs, when the downlink control information schedules a plurality of retransmitted TBs, or when determining that the downlink control information comprises the second field and/or the third field, set a bit state of a second bit in the downlink control information to 1, wherein the second bit is one bit; or when the downlink control information is capable of scheduling only one or two TBs, determine that the downlink control information further comprises a third bit, wherein the third bit is one bit; and set a bit state of the third bit to 0.

In a further embodiment, the processing module is configured to: when the downlink control information schedules a plurality of newly transmitted TBs, or when the downlink control information schedules a plurality of retransmitted TBs, set a bit state of a second bit in the downlink control information to 1; or when the downlink control information is capable of scheduling only one TB, set a bit state of a second bit in the downlink control information to 0, wherein the second bit is one bit.

In an exemplary embodiment, the present application provides an information processing method, including:
  if a bit state of the second bit is 1, the terminal device determines that the downlink control information is capable of scheduling a maximum of N TBs, wherein N is a positive integer greater than 1, the downlink control information comprises a second field and/or a third field, the second field is used to indicate HARQ process numbers of the maximum of N TBs and/or first identification information, and the third field is used to indicate second identification information; and the method further comprises:
  determining, by the terminal device based on the second field, a quantity L of TBs scheduled by the downlink control information, wherein L is a positive integer;

determining, by the terminal device based on the second field, HARQ process numbers of the L TBs scheduled by the downlink control information, wherein the second field comprises eight or nine bits, and a HARQ process number of each of the L TBs is determined based on the second field in a bitmap manner;

determining, by the terminal device, NDI information of each of the L TBs based on the first identifier or a second identifier; and sending or receiving, by the terminal device, the L TBs based on the determined HARQ process number of each of the L TBs and the NDI information of each of the L TBs.

In a further embodiment, the third field comprises one bit.

In a further embodiment

NDIs for the L TBs are the same; or a previous NDI for the L TBs is the same.

In a further embodiment, if a bit state of the second bit is 0, the terminal device determines that the downlink control information is capable of scheduling only one or two TBs, wherein the downlink control information comprises a fourth field and/or a fifth field, the fourth field is used to indicate a HARQ process number and/or NDI information, and the fifth field is used to indicate a redundancy version (RV); and the method further comprises:

determining, by the terminal device based on the fourth field, a quantity L of TBs scheduled by the downlink control information, wherein L is a positive integer;

determining, by the terminal device based on the fourth field, HARQ process numbers of the L TBs scheduled by the downlink control information, wherein determining, by the terminal device, NDI information of each of the L TBs based on the fourth field; and sending or receiving, by the terminal device, the L TBs based on the determined HARQ process number of each of the L TBs and the NDI information of each of the L TBs.

In a further embodiment, determining, by the terminal device, information about the redundancy version based on the fifth field and/or the fourth field.

In a further embodiment, the fourth field comprises seven bits or nine bits; and/or the fifth field comprises two bits.

In a further embodiment, if a bit state of the second bit is 1, the terminal device determines that the downlink control information is capable of scheduling a maximum of N TBs, wherein N is a positive integer greater than 1, the downlink control information comprises a second field and/or a third field, the second field is used to indicate HARQ process numbers of the maximum of N TBs and/or first identification information, and the third field is used to indicate second identification information; and the method further comprises:

determining, by the terminal device based on the second field, a quantity L of TBs scheduled by the downlink control information, wherein L is a positive integer;

determining, by the terminal device based on the second field, HARQ process numbers of the L TBs scheduled by the downlink control information, wherein the second field comprises eight or nine bits, and a HARQ process number of each of the L TBs is determined based on the second field in a bitmap manner;

determining, by the terminal device, NDI information of each of the L TBs based on the first identifier or a second identifier; and sending or receiving, by the terminal device, the L TBs based on the determined HARQ process number of each of the L TBs and the NDI information of each of the L TBs.

In an implementation, a network device may determine scheduling information of one or more TBs based on the following table. The scheduling information includes one or more pieces of the following information: a HARQ process number, NDI information, and an RV. The network device sends, the scheduling information by using downlink control information.

A terminal device receives the downlink control information sent by the network device, and may determine or parse the scheduling information based on Table 5. The terminal device receives or sends data based on the determined scheduling information. In Table 5, b0 to b9 represents ten bits or numbers of ten bits, N(i) represents NDI information of an $i^{th}$ TB, and H(i) represents whether a TB associated with an $i^{th}$ HARQ process is scheduled. For example, H(i)=1 represents that the $i^{th}$ HARQ process is scheduled, and H(i)=0 represents that the $i^{th}$ HARQ process is not scheduled. Whether a HARQ process is scheduled may also be understood as whether a TB corresponding to the HARQ process number is scheduled.

TABLE 5

| | One bit | b0 | b1 | b2 | b3 | b4 | b5 | b6 | b7 | b8 | b9 | Starting HARQ process ID |
|---|---|---|---|---|---|---|---|---|---|---|---|---|
| | | | | Number of scheduled HARQ processes = 8 | | | | | | | | |
| First manner | 1 | 1 | 1 | N(0) | N(1) | N(2) | N(3) | N(4) | N(5) | N(6) | N(7) | 0 |
| | | | | Number of scheduled HARQ processes = 7 | | | | | | | | |
| | | 1 | 0 | 1 | N(0) | N(1) | N(2) | N(3) | N(4) | N(5) | N(6) | 0 |
| | | 0 | 1 | 1 | N(0) | N(1) | N(2) | N(3) | N(4) | N(5) | N(6) | 1 |
| | | | | Number of scheduled HARQ processes = 6 | | | | | | | | |
| | | 1 | 0 | 0 | 1 | N(0) | N(1) | N(2) | N(3) | N(4) | N(5) | 0 |
| | | 0 | 1 | 0 | 1 | N(0) | N(1) | N(2) | N(3) | N(4) | N(5) | 1 |
| | | 0 | 0 | 1 | 1 | N(0) | N(1) | N(2) | N(3) | N(4) | N(5) | 2 |

TABLE 5-continued

| One bit | b0 | b1 | b2 | b3 | b4 | b5 | b6 | b7 | b8 | b9 | Starting HARQ process ID |
|---|---|---|---|---|---|---|---|---|---|---|---|
| | | | | Number of scheduled HARQ processes = 5 | | | | | | | |
| | 1 | 0 | 0 | 0 | 1 | N(0) | N(1) | N(2) | N(3) | N(4) | 0 |
| | 0 | 1 | 0 | 0 | 1 | N(0) | N(1) | N(2) | N(3) | N(4) | 1 |
| | 0 | 0 | 1 | 0 | 1 | N(0) | N(1) | N(2) | N(3) | N(4) | 2 |
| | 0 | 0 | 0 | 1 | 1 | N(0) | N(1) | N(2) | N(3) | N(4) | 3 |
| | | | | Number of scheduled HARQ processes = 4 | | | | | | | |
| | 1 | 0 | 0 | 0 | 0 | 1 | N(0) | N(1) | N(2) | N(3) | 0 |
| | 0 | 1 | 0 | 0 | 0 | 1 | N(0) | N(1) | N(2) | N(3) | 1 |
| | 0 | 0 | 1 | 0 | 0 | 1 | N(0) | N(1) | N(2) | N(3) | 2 |
| | 0 | 0 | 0 | 1 | 0 | 1 | N(0) | N(1) | N(2) | N(3) | 3 |
| | | | | Number of scheduled HARQ processes = 3 | | | | | | | |
| | 1 | 0 | 0 | 0 | 0 | 0 | 1 | N(0) | N(1) | N(2) | 0 |
| | 0 | 1 | 0 | 0 | 0 | 0 | 1 | N(0) | N(1) | N(2) | 1 |
| | 0 | 0 | 1 | 0 | 0 | 0 | 1 | N(0) | N(1) | N(2) | 2 |
| | 0 | 0 | 0 | 1 | 0 | 0 | 1 | N(0) | N(1) | N(2) | 3 |
| | 0 | 0 | 0 | 0 | 1 | 0 | 1 | N(0) | N(1) | N(2) | 4 |
| | | | | Number of scheduled HARQ processes = 2 | | | | | | | |
| | 1 | 0 | 0 | 0 | 0 | 0 | 0 | 1 | N(0) | N(1) | 0 |
| | 0 | 1 | 0 | 0 | 0 | 0 | 0 | 1 | N(0) | N(1) | 1 |
| | 0 | 0 | 1 | 0 | 0 | 0 | 0 | 1 | N(0) | N(1) | 2 |
| | 0 | 0 | 0 | 1 | 0 | 0 | 0 | 1 | N(0) | N(1) | 3 |
| | 0 | 0 | 0 | 0 | 1 | 0 | 0 | 1 | N(0) | N(1) | 4 |
| | 0 | 0 | 0 | 0 | 0 | 1 | 0 | 1 | N(0) | N(1) | 5 |
| | | | | Number of scheduled HARQ processes = 1 | | | | | | | |
| | 1 | 0 | 0 | 0 | 0 | 0 | 0 | 0 | 1 | N(0) | 0 |
| | 0 | 1 | 0 | 0 | 0 | 0 | 0 | 0 | 1 | N(0) | 1 |
| | 0 | 0 | 1 | 0 | 0 | 0 | 0 | 0 | 1 | N(0) | 2 |
| | 0 | 0 | 0 | 1 | 0 | 0 | 0 | 0 | 1 | N(0) | 3 |
| | 0 | 0 | 0 | 0 | 1 | 0 | 0 | 0 | 1 | N(0) | 4 |
| | 0 | 0 | 0 | 0 | 0 | 1 | 0 | 0 | 1 | N(0) | 5 |
| | 0 | 0 | 0 | 0 | 0 | 0 | 1 | 0 | 1 | N(0) | 6 |
| | 0 | 0 | 0 | 0 | 0 | 0 | 0 | 1 | 1 | N(0) | 7 |
| Second manner | 0 | 1 | Flag | H(0) | H(1) | H(2) | H(3) | H(4) | H(5) | H(6) | H(7) |
| One or two TBs | 0 | | HARQ process ID for TB 1 & TB 2 | | | | | | RV | | |

A quantity L of transport blocks TBs scheduled by the downlink control information may alternatively be a quantity L of hybrid automatic retransmission request HARQ processes indicated by the downlink control information, in other words, the TBs are in a one-to-one correspondence with the HARQ processes.

It should be noted that the NDI information may indicate whether data scheduled by the downlink control information is a newly transmitted TB or a retransmitted TB. For example, the NDI information may include feedback information of each of the L TBs, and the feedback information of the TB may also be referred to as acknowledgment information of the TB.

A base station determines a quantity of TBs scheduled by the DCI, and determines one or more of a HARQ process ID of each scheduled TB, an NDI for each TB, and an RV. If the base station determines to indicate the scheduling information in the first manner, a first bit is set to 1. In this case, a first field is included, and the first field includes ten bits. Optionally, in the first manner, a plurality of scheduled HARQ processes are consecutive, and/or the NDI information is indicated by using the first field (or some bits in the first field) in a bitmap manner.

Alternatively, if the base station determines to indicate the scheduling information in the second manner, a first bit is 0, and a second bit is 1. Optionally, in this case, the downlink control information includes a second field and/or a third field. The second field is used to indicate HARQ process numbers of a maximum of N TBs and/or first identification information, and the third field is used to indicate second identification information. A second identifier or a first identifier is used to indicate newly transmitted or retransmitted information, or a second identifier or a first identifier is used to indicate the NDI information. The second field includes eight or nine bits, and a HARQ process number of each of the L TBs is determined based on the second field in a bitmap manner.

Alternatively, if the base station determines that a quantity of TBs scheduled by the DCI is 1 or 2, a first bit is 0, and a second bit is 0. The downlink control information includes a fourth field and/or a fifth field, the fourth field is used to indicate a HARQ process number and/or NDI information, and the fifth field is used to indicate a redundancy version (RV).

User equipment receives the downlink control information DCI sent by the base station. The user equipment determines one or more of a HARQ process ID of each TB, an NDI for each TB, and an RV based on the DCI. If the first bit is 1, the scheduling information is determined in the first manner. If the base station determines to indicate the scheduling information in the first manner, the first bit is set to 1. In this case, a first field is included, and the first field includes ten bits. Optionally, in the first manner, a plurality of scheduled HARQ processes are consecutive, and/or the NDI information is indicated by using the first field (or some bits in the first field) in a bitmap manner.

Alternatively, the user equipment determines the scheduling information in the second manner based on that the first bit is 0 and the second bit is 1. Optionally, in this case, the downlink control information includes a second field and/or a third field. The second field is used to indicate HARQ process numbers of a maximum of N TBs and/or first identification information, and the third field is used to indicate second identification information. A second identifier or a first identifier is used to indicate newly transmitted or retransmitted information, or a second identifier or a first identifier is used to indicate the NDI information. The second field includes eight or nine bits, and a HARQ process number of each of the L TBs is determined based on the second field in a bitmap manner.

Alternatively, the user equipment determines, based on that the first bit is 0 and the second bit is 0, that the quantity of TBs scheduled by the DCI is 1 or 2. The downlink control information includes a fourth field and/or a fifth field, the fourth field is used to indicate a HARQ process number and/or NDI information, and the fifth field is used to indicate a redundancy version (RV).

A second device receives first information from a first device. For example, the first information is downlink control information (DCI). The first information includes first indication information and/or second indication information. The first indication information is used to indicate that quantities of scheduled TBs are a first set or a second set, and the first set is different from the second set (there is at least one quantity of TBs belonging to the second set but not belonging to the first set); or the first indication information and/or the second indication information is used to indicate a manner of scheduling a plurality of TBs.

In an example description, quantities of TBs included in the first set are 1 and 2. In other words, in this case, the first information indicates that the quantity of scheduled TBs is 1 or 2. Quantities of TBs included in the second set are {1, 2, 3, 4, 5, 6, 7, 8} or {3, 4, 5, 6, 7, 8}.

In an example description, the first indication information includes a first field, and a bit x in the first field is used to indicate the first indication information. For example, if x=1, a first state (such as 1) of the first field is used to indicate that the quantity of scheduled TBs belongs to the first set, and a second state (such as 0) of the first field is used to indicate that the quantity of scheduled TBs belongs to the second set; or if x=2, a first state (such as 00) of the first field is used to indicate that the quantity of scheduled TBs belongs to the first set, and a second state (such as 01) of the first field is used to indicate that the quantity of scheduled TBs belongs to the second set.

In an example description, the first indication information includes one or more fields, and a bit x in the first indication information is used to indicate that the quantity of scheduled TBs belongs to the first set or one or more TBs are scheduled by using a first scheduling scheme. For example, in the first manner, one or more scheduled TBs are all newly transmitted TBs or retransmitted TBs. For example, in the first manner, HARQ processes associated with a plurality of scheduled TBs are consecutive or inconsecutive. In other words, in this case, a HARQ process number is indicated in a bitmap manner by using the second field.

In an example description, the first information includes first indication information and second indication information. The first indication information includes one or more fields, and the second indication information includes one or more fields. A bit x in the first indication information is used to indicate that one or more TBs are scheduled by using a second scheduling scheme, and a quantity of scheduled TBs belongs to a first set; or one or more TBs are scheduled by using a first scheduling scheme or in the second manner. For example, in the first manner, one or more scheduled TBs are all newly transmitted TBs or retransmitted TBs. For example, in the first manner, HARQ processes associated with a plurality of scheduled TBs are consecutive or inconsecutive. In other words, in this case, a HARQ process number is indicated in a bitmap manner by using the second field. For example, in the second manner, HARQ processes associated with a plurality of scheduled TBs are consecutive.

That the foregoing HARQ processes are consecutive may also be understood as that HARQ process numbers of one or more scheduled TBs are determined based on the $1^{st}$ HARQ process number and a quantity of the scheduled TBs.

Signaling overheads can be effectively reduced by using the another communication method provided in this embodiment of this application.

This application provides still another communication method. The method may be applied to the terminal device in the communication system shown in FIG. 1.

A HARQ process number of each TB ranges from 0 to 7. An NDI for each TB has two values. When DCI schedules one TB, there are 8 (which is a quantity of HARQ process ID values)*2 (which is a quantity of possible NDI values)=16 combinations. When the DCI schedules two TBs, there are 28 (which is a quantity of combinations of HARQ process IDs of two TBs)*4 (which a quantity of possible NDI values of two TBs)=112 combinations. Therefore, scheduling of one TB and two TBs has a total of 16+112=128 combinations. Therefore, in the DCI, there are seven bits indicating a HARQ process ID and an NDI for one transport block TB scheduled by the DCI or indicating a HARQ process ID or an NDI for each of two TBs scheduled by the DCI. When the DCI schedules one TB, a value of a HARQ process ID of the TB ranges from 0 to 7, and a new data indicator of the TB needs to be indicated in the DCI. When the DCI schedules two TBs, a value of a HARQ process ID of one TB (which may also be referred to as the $1^{st}$ TB) ranges from 0 to 7, and a value of a HARQ process ID of the other TB (which may also be referred to as the $2^{nd}$ TB) ranges from 0 to 7, but the HARQ process ID of the $1^{st}$ TB is different from the HARQ process ID of the $2^{nd}$ TB. Respective NDIs for the two TBs need to be indicated in the DCI.

One of the seven bits in the DCI is an NDI for a first TB. For example, the first TB is one of N TBs scheduled by the DCI. N=1 or N=2. Three of the seven bits in the DCI indicate a HARQ process ID 1 in {0 to 7}, and other three of the seven bits in the DCI indicate a HARQ process ID 2 in {0 to 7}. A value of the HARQ process ID 1 may be the same as a value of the HARQ process ID 2. Alternatively, a value of the HARQ process ID 1 may be different from a value of the HARQ process ID 2. A HARQ process number of one TB is the HARQ process ID 1, and a HARQ process number of another TB is the HARQ process ID 2.

If the value of the HARQ process ID 1 is the same as the value of the HARQ process ID 2, it indicates that the DCI schedules one TB, and a HARQ process ID of the TB=the HARQ process ID 1=the HARQ process ID 2. If the value of the HARQ process ID 1 is different from the value of the HARQ process ID 2, it indicates that the DCI schedules two TBs.

If the value of the HARQ process ID 1 is less than the value of the HARQ process ID 2, it indicates that an NDI for the other TB, other than a first TB, in the two TBs scheduled by the DCI is equal to 0. If the value of the HARQ process ID 1 is greater than the value of the HARQ process ID 2, it indicates that an NDI for the other TB, other than a first TB, in the two TBs scheduled by the DCI is equal to 1. For example, the first TB is the $1^{st}$ TB in two TBs scheduled by the DCI. If the value of the HARQ process ID 1 is less than the value of the HARQ process ID 2, it indicates that an NDI for the $2^{nd}$ TB scheduled by the DCI is equal to 0. If the value of the HARQ process ID 1 is greater than the value of the HARQ process ID 2, it indicates that an NDI for the $2^{nd}$ TB scheduled by the DCI is equal to 1. For example, in two scheduled TBs, a HARQ process number of one TB is the HARQ process ID 1, and a HARQ process number of the other TB is the HARQ process ID 2. For example, a first TB is one of two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2. If the value of the HARQ process ID 1 is less than the value of the HARQ process ID 2, it indicates that an NDI for the second TB scheduled by the DCI is equal to 0. If the value of the HARQ process ID 1 is greater than the value of the HARQ process ID 2, it indicates that an NDI for the second TB scheduled by the DCI is equal to 1.

Alternatively, if the value of the HARQ process ID 1 is greater than the value of the HARQ process ID 2, it indicates that an NDI for the other TB, other than a first TB, in the two TBs scheduled by the DCI is equal to 0. If the value of the HARQ process ID 1 is less than the value of the HARQ process ID 2, it indicates that an NDI for the other TB, other than a first TB, in the two TBs scheduled by the DCI is equal to 1. For example, the first TB is the $1^{st}$ TB in two TBs scheduled by the DCI. If the value of the HARQ process ID 1 is greater than the value of the HARQ process ID 2, it indicates that an NDI for the $2^{nd}$ TB scheduled by the DCI is equal to 0. If the value of the HARQ process ID 1 is less than the value of the HARQ process ID 2, it indicates that an NDI for the $2^{nd}$ TB scheduled by the DCI is equal to 1. For example, a first TB is one of two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2. If the value of the HARQ process ID 1 is greater than the value of the HARQ process ID 2, it indicates that an NDI for the second TB scheduled by the DCI is equal to 0. If the value of the HARQ process ID 1 is less than the value of the HARQ process ID 2, it indicates that an NDI for the second TB scheduled by the DCI is equal to 1.

A base station determines a quantity of TBs scheduled by the DCI, a HARQ process ID of each scheduled TB, and an NDI for each scheduled TB. If the base station determines that the quantity of TBs scheduled by the DCI is equal to 1, the base station indicates an NDI for the TB by using one bit in the DCI, indicates the HARQ process ID 1 in the range {0 to 7} by using three bits in the DCI, and indicates the HARQ process ID 2 in the range {0 to 7} by using three bits in the DCI, and the HARQ process ID 1 is equal to the HARQ process ID 2.

If the base station determines that the quantity of TBs scheduled by the DCI is equal to 2, the base station indicates an NDI for a first TB by using one bit in the DCI, the first TB is one of two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2. The base station indicates the HARQ process ID 1 in the range {0 to 7} by using three bits in the DCI, and indicates the HARQ process ID 2 in the range {0 to 7} by using three bits in the DCI, and the HARQ process ID 1 is not equal to the HARQ process ID 2. If the base station determines that an NDI for the second TB is equal to 0, the value of the HARQ process ID 1 is less than the value of the HARQ process ID 2. If the base station determines that an NDI for the second TB is equal to 1, the value of the HARQ process ID 1 is greater than the value of the HARQ process ID 2. Alternatively, if the base station determines that an NDI for the second TB is equal to 0, the value of the HARQ process ID 1 is greater than the value of the HARQ process ID 2. If the base station determines that an NDI for the second TB is equal to 1, the value of the HARQ process ID 1 is less than the value of the HARQ process ID 2.

User equipment receives the downlink control information DCI sent by the base station. Seven bits in the DCI indicate the quantity of TBs scheduled by the DCI. A HARQ process ID of each TB scheduled by the DCI is determined, and an NDI for each TB scheduled by the DCI is determined. One of the seven bits in the DCI is an NDI for a first TB. For example, the first TB is one of N TBs scheduled by the DCI. N=1 or N=2. Three of the seven bits in the DCI indicate a HARQ process ID 1 in {0 to 7}, and other three of the seven bits in the DCI indicate a HARQ process ID 2 in {0 to 7}. A value of the HARQ process ID 1 may be the same as a value of the HARQ process ID 2. Alternatively, a value of the HARQ process ID 1 may be different from a value of the HARQ process ID 2.

If the value of the HARQ process ID 1 is the same as the value of the HARQ process ID 2, the user equipment determines that the DCI schedules one TB, and a HARQ process ID of the TB=the HARQ process ID 1=the HARQ process ID 2. If the value of the HARQ process ID 1 is different from the value of the HARQ process ID 2, the user equipment determines that the DCI schedules two TBs. A first TB is one of the two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2.

If the value of the HARQ process ID 1 is less than the value of the HARQ process ID 2, the user equipment determines that an NDI for the second TB scheduled by the DCI is equal to 0. If the value of the HARQ process ID 1 is greater than the value of the HARQ process ID 2, the user equipment determines that an NDI for the second TB scheduled by the DCI is equal to 1.

Alternatively, if the value of the HARQ process ID 1 is greater than the value of the HARQ process ID 2, the user equipment determines that an NDI for the second TB scheduled by the DCI is equal to 0. If the value of the HARQ process ID 1 is less than the value of the HARQ process ID 2, the user equipment determines that an NDI for the second TB scheduled by the DCI is equal to 1.

Table 6 shows seven bits in DCI.

TABLE 6

| NDI for first TB (one bit) | HARQ process ID 1 (three bits) | HARQ process ID 2 (three bits) |
|---|---|---|

When a quantity of scheduled TBs is 1 or 2, the NDI and the HARQ process ID (the HARQ process number) may be indicated in the manner shown in Table 7.

TABLE 7

| Seven bits in DCI | | |
|---|---|---|
| One bit | Three bits | Three bits |
| NDI for $1^{st}$ TB | HARQ process ID 1 | HARQ process ID 2 |
| Single TB: HARQ process ID 1 = HARQ process ID 2 | | |
| Two TBs: HARQ process ID 1 ≠ HARQ process ID 2 | | |
| NDI = 0 for $2^{nd}$ TB if HARQ process ID 1 < HARQ process ID 2 | | |
| NDI = 1 for $2^{nd}$ TB if HARQ process ID 1 > HARQ process ID 2 | | |

In Table 7, single TB: HARQ process ID 1=HARQ process ID 2, two TBs: HARQ process ID 1≠HARQ process ID 2, NDI=0 for $2^{nd}$ TB if HARQ process ID 1<HARQ process ID 2, and NDI=1 for $2^{nd}$ TB if HARQ process ID 1>HARQ process ID 2.

Signaling overheads can be effectively reduced by using the still another communication method provided in this embodiment of this application.

This application further provides a communication method. The method may be applied to the terminal device in the communication system shown in FIG. 1.

A value of a HARQ of each transport block (TB) ranges from 0 to N−1. A new data indicator (NDI) of each TB has two values. When the downlink control information (DCI) schedules one TB, there are N (which is a quantity of HARQ process ID values)*2 (which is a quantity of possible NDI values)=2N combinations. When the DCI schedules two TBs, there are $c_N^2$ (which is a quantity of combinations of HARQ process IDs of two TBs, where two HARQ processes are selected from N HARQ processes)*4 (which is a quantity of possible NDI values of two TBs)=2*$c_N^2$ combinations. Therefore, scheduling of one TB and two TBs has a total of 2N+2*$c_N^2$ combinations. Therefore, M1=log 2(2N+ 2*$c_N^2$) bits are required in the DCI. Alternatively, scheduling of one TB and two TBs occupies a total of M2=2+2*log 2(N) bits.

Optionally, log 2(N) bits in the DCI are used to indicate a HARQ process ID 1 (which may also be referred to as a HARQ process corresponding to a first TB), and other log 2(N) bits in the DCI are used to indicate a HARQ process ID 2 (which may also be referred to as a HARQ process corresponding to another TB other than the first TB when two TBs are scheduled). When the HARQ process ID 1 is equal to the HARQ process ID 2, it indicates that one TB is scheduled; when the HARQ process ID 1 is not equal to the HARQ process ID 2, it indicates that two TBs are scheduled. Herein, that the HARQ process ID 1 is equal to the HARQ process ID 2 means that bit values or states of the HARQ process ID 1 and the HARQ process ID 2 are the same; and that the HARQ process ID 1 is not equal to the HARQ process ID 2 means that bit values or states of the HARQ process ID 1 and the HARQ process ID 2 are different.

Optionally, one bit in the DCI is used to indicate an NDI corresponding to the HARQ process ID 1. Another bit in the DCI is used to indicate an NDI corresponding to the HARQ process ID 2. Optionally, when a quantity of scheduled TBs is 1, the another bit used to indicate the NDI corresponding to the HARQ process ID 2 is ignored or does not exist, or has a same value as the bit used to indicate the NDI corresponding to the HARQ process ID 1.

For example, when N=8, three bits are used to indicate the HARQ process ID 1, other three bits are used to indicate the HARQ process ID 2, one bit is used to indicate the NDI corresponding to the HARQ process ID 1, and another bit is used to indicate the NDI corresponding to the HARQ process ID 2.

Optionally, one bit in the DCI is used to indicate the NDI corresponding to the HARQ process ID 1. When the HARQ process ID 1 is not equal to the HARQ process ID 2, that is, two TBs are scheduled, if the value of the HARQ process ID 1 is greater than that of the HARQ process ID 2, it indicates that a value of the NDI corresponding to the HARQ process ID 2 is the same as that of the NDI corresponding to the HARQ process ID 1; or if the value of the HARQ process ID 1 is less than that of the HARQ process ID 2, it indicates that a value of the NDI corresponding to the HARQ process ID 2 is different from that of the NDI corresponding to the HARQ process ID 1.

Optionally, one bit in the DCI is used to indicate the NDI corresponding to the HARQ process ID 1. When the HARQ process ID 1 is not equal to the HARQ process ID 2, that is, two TBs are scheduled, if the value of the HARQ process ID 1 is greater than that of the HARQ process ID 2, it indicates that a value of the NDI corresponding to the HARQ process ID 2 is different from that of the NDI corresponding to the HARQ process ID 1; or if the value of the HARQ process ID 1 is less than that of the HARQ process ID 2, it indicates that a value of the NDI corresponding to the HARQ process ID 2 is the same as that of the NDI corresponding to the HARQ process ID 1.

A base station determines a quantity of TBs scheduled by the DCI, a HARQ process ID of each scheduled TB, and an NDI for each scheduled TB. If the base station determines that the quantity of TBs scheduled by the DCI is equal to 1, the base station indicates an NDI for the TB by using one bit in the DCI, indicates the HARQ process ID 1 in the range {0 to N−1} by using log 2(N) bits in the DCI, and indicates the HARQ process ID 2 in the range {0 to N−1} by using log 2(N) bits in the DCI, and the HARQ process ID 1 is equal to the HARQ process ID 2.

If the base station determines that the quantity of TBs scheduled by the DCI is equal to 2, the base station indicates an NDI for a first TB by using one bit in the DCI, the first TB is one of two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2. The base station indicates the HARQ process ID 1 in the range {0 to N−1} by using log 2(N) bits in the DCI, and indicates the HARQ process ID 2 in the range {0 to N−1} by using log 2(N) bits in the DCI, and the HARQ process ID 1 is not equal to the HARQ process ID 2. If the base station determines that an NDI for the second TB is the same as the NDI for the first TB, the value of the HARQ process ID 1 is less than the value of the HARQ process ID 2; or if the base station determines that the NDI for the second TB is different from the NDI for the first TB, the value of the HARQ process ID 1 is greater than the value of the HARQ process ID 2. Alternatively, if the base station determines that an NDI for the second TB is the same as the NDI for the first TB, the value of the HARQ process ID 1 is greater than the value of the HARQ process ID 2; or if the base station determines that the NDI for the second TB is different from the NDI for the first TB, the value of the HARQ process ID 1 is less than the value of the HARQ process ID 2.

User equipment receives the downlink control information DCI sent by the base station. M1 bits in the DCI indicate the quantity of TBs scheduled by the DCI. A HARQ process ID of each TB scheduled by the DCI is determined, and an NDI for each TB scheduled by the DCI is determined. One of the M1 bits in the DCI is an NDI for a first TB. For example, the first TB is one of Q TBs scheduled by the DCI. Q=1 or Q=2. log 2(N) of the M1 bits in the DCI indicate a HARQ process ID 1 in {0 to N−1}, and other log 2(N) of the M1 bits in the DCI indicate a HARQ process ID 2 in {0 to N−1}. A value of the HARQ process ID 1 may be the same as a value of the HARQ process ID 2. Alternatively, a value of the HARQ process ID 1 may be different from a value of the HARQ process ID 2.

If the value of the HARQ process ID 1 is the same as the value of the HARQ process ID 2, the user equipment determines that the DCI schedules one TB, and a HARQ process ID of the TB=the HARQ process ID 1=the HARQ process ID 2. If the value of the HARQ process ID 1 is different from the value of the HARQ process ID 2, the user equipment determines that the DCI schedules two TBs. A first TB is one of the two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2.

Optionally, one of M1 bits in the DCI indicates the NDI corresponding to the first TB (or the HARQ process ID 1); and the terminal device determines, based on the bit, the NDI corresponding to the first TB (or the HARQ process ID 1). If the value of the HARQ process ID 1 is less than the value of the HARQ process ID 2, the user equipment determines, based on another bit of the M2 bits in the DCI, the NDI corresponding to the second TB (namely, the HARQ process ID 2) scheduled by the DCI.

Optionally, one of M1 bits in the DCI indicates the NDI corresponding to the first TB (or the HARQ process ID 1); and the terminal device determines, based on the bit, the NDI corresponding to the first TB (or the HARQ process ID 1). If the value of the HARQ process ID 1 is less than the value of the HARQ process ID 2, the user equipment determines that the NDI corresponding to the second TB (namely, the HARQ process ID 2) scheduled by the DCI is the same as the NDI corresponding to the first TB. If the value of the HARQ process ID 1 is greater than the value of the HARQ process ID 2, the user equipment determines that the NDI corresponding to the second TB (namely, the HARQ process ID 2) scheduled by the DCI is different from the NDI corresponding to the first TB (or the HARQ process ID 1).

Alternatively, if the value of the HARQ process ID 1 is less than the value of the HARQ process ID 2, the user equipment determines that the NDI corresponding to the second TB (namely, the HARQ process ID 2) scheduled by the DCI is different from the NDI corresponding to the first TB. If the value of the HARQ process ID 1 is greater than the value of the HARQ process ID 2, the user equipment determines that the NDI corresponding to the second TB (namely, the HARQ process ID 2) scheduled by the DCI is the same as the NDI corresponding to the first TB (or the HARQ process ID 1).

For example, when N=8, M1=7, and in the DCI, there are seven bits indicating a HARQ process ID and an NDI for one transport block TB scheduled by the DCI or indicating a HARQ process ID or an NDI for each of two TBs scheduled by the DCI. When the DCI schedules one TB, a value of a HARQ process ID of the TB ranges from 0 to 7, and a new data indicator of the TB needs to be indicated in the DCI. When the DCI schedules two TBs, a value of a HARQ process ID of one TB (which may also be referred to as the $1^{st}$ TB) ranges from 0 to 7, and a value of a HARQ process ID of the other TB (which may also be referred to as the $2^{nd}$ TB) ranges from 0 to 7 and is different from the value of the HARQ process of the previous TB, and the HARQ process ID of the $1^{st}$ TB is different from the HARQ process ID of the $2^{nd}$ TB. Respective NDIs for the two TBs need to be indicated in the DCI.

One of the seven bits in the DCI is an NDI for a first TB. For example, the first TB is one of Q TBs scheduled by the DCI. Q=1 or Q=2. Three of the seven bits in the DCI indicate a HARQ process ID 1 in {0 to 7}, and other three of the seven bits in the DCI indicate a HARQ process ID 2 in {0 to 7}. A value of the HARQ process ID 1 may be the same as a value of the HARQ process ID 2. Alternatively, a value of the HARQ process ID 1 may be different from a value of the HARQ process ID 2. A HARQ process number of one TB is the HARQ process ID 1, and a HARQ process number of another TB is the HARQ process ID 2.

If the value of the HARQ process ID 1 is the same as the value of the HARQ process ID 2, it indicates that the DCI schedules one TB, and a HARQ process ID of the TB=the HARQ process ID 1=the HARQ process ID 2. If the value of the HARQ process ID 1 is different from the value of the HARQ process ID 2, it indicates that the DCI schedules two TBs.

One bit in the DCI is used to indicate the NDI corresponding to the HARQ process ID 1 or the first TB. If the value of the HARQ process ID 1 is less than the value of the HARQ process ID 2, it indicates that an NDI for the other TB, other than the first TB, in two TBs scheduled by the DCI is the same as the NDI for the first TB, or an NDI for the HARQ process ID 2 is the same as an NDI for the HARQ process ID 1. If the value of the HARQ process ID 1 is greater than the value of the HARQ process ID 2, it indicates that an NDI for the other TB, other than the first TB, in two TBs scheduled by the DCI is different from the NDI for the first TB, or an NDI for the HARQ process ID 2 is different from an NDI for the HARQ process ID 1. For example, the first TB is the $1^{st}$ TB in two TBs scheduled by the DCI.

Alternatively, one bit in the DCI is used to indicate the NDI corresponding to the HARQ process ID 1 or the first TB. If the value of the HARQ process ID 1 is less than the value of the HARQ process ID 2, it indicates that an NDI for the other TB, other than the first TB, in two TBs scheduled by the DCI is different from the NDI for the first TB, or an NDI for the HARQ process ID 2 is different from an NDI for the HARQ process ID 1. If the value of the HARQ process ID 1 is greater than the value of the HARQ process ID 2, it indicates that an NDI for the other TB, other than the first TB, in two TBs scheduled by the DCI is the same as the NDI for the first TB, or an NDI for the HARQ process ID 2 is the same as an NDI for the HARQ process ID 1. For example, the first TB is the $1^{st}$ TB in two TBs scheduled by the DCI.

A base station determines a quantity of TBs scheduled by the DCI, a HARQ process ID of each scheduled TB, and an NDI for each scheduled TB. If the base station determines that the quantity of TBs scheduled by the DCI is equal to 1, the base station indicates an NDI for the TB by using one bit in the DCI, indicates the HARQ process ID 1 in the range {0 to 7} by using three bits in the DCI, and indicates the HARQ process ID 2 in the range {0 to 7} by using three bits in the DCI, and the HARQ process ID 1 is equal to the HARQ process ID 2.

If the base station determines that the quantity of TBs scheduled by the DCI is equal to 2, the base station indicates an NDI for a first TB by using one bit in the DCI, the first TB is one of two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2. The base station indicates the HARQ process ID 1 in the range {0 to 7} by using three bits in the DCI, and indicates the HARQ process ID 2 in the range {0 to 7} by using three bits in the DCI, and the HARQ process ID 1 is not equal to the HARQ process ID 2. If the base station determines that an NDI for the second TB is the same as the NDI for the first TB, the value of the HARQ process ID 1 is less than the value of the HARQ process ID 2; or if the base station determines that the NDI for the second TB is different from the NDI for the first TB, the value of the HARQ process ID 1 is greater than the value of the HARQ process ID 2. Alternatively, if the base station determines that an NDI for the second TB is the same as the NDI for the first TB, the value of the HARQ process ID 1 is greater than the value of the HARQ process ID 2; or if the base station determines that the NDI for the second TB is different from the NDI for the first TB, the value of the HARQ process ID 1 is less than the value of the HARQ process ID 2.

User equipment receives the downlink control information DCI sent by the base station. Seven bits in the DCI indicate the quantity of TBs scheduled by the DCI. A HARQ process ID of each TB scheduled by the DCI is determined, and an NDI for each TB scheduled by the DCI is determined. One of the seven bits in the DCI is an NDI for a first TB. For example, the first TB is one of Q TBs scheduled by the DCI. Q=1 or Q=2. Three of the seven bits in the DCI indicate a HARQ process ID 1 in {0 to 7}, and other three of the seven bits in the DCI indicate a HARQ process ID 2 in {0 to 7}. A value of the HARQ process ID 1 may be the same as a value of the HARQ process ID 2. Alternatively, a value of the HARQ process ID 1 may be different from a value of the HARQ process ID 2.

If the value of the HARQ process ID 1 is the same as the value of the HARQ process ID 2, the user equipment determines that the DCI schedules one TB, and a HARQ process ID of the TB=the HARQ process ID 1=the HARQ process ID 2. If the value of the HARQ process ID 1 is different from the value of the HARQ process ID 2, the user equipment determines that the DCI schedules two TBs. A first TB is one of the two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2.

Optionally, one of the seven bits in the DCI indicates the NDI corresponding to the first TB (or the HARQ process ID 1); and the terminal device determines, based on the bit, the NDI corresponding to the first TB (or the HARQ process ID 1). If the value of the HARQ process ID 1 is less than the value of the HARQ process ID 2, the user equipment determines that the NDI corresponding to the second TB (namely, the HARQ process ID 2) scheduled by the DCI is the same as the NDI corresponding to the first TB. If the value of the HARQ process ID 1 is greater than the value of the HARQ process ID 2, the user equipment determines that the NDI corresponding to the second TB (namely, the HARQ process ID 2) scheduled by the DCI is different from the NDI corresponding to the first TB (or the HARQ process ID 1).

Alternatively, if the value of the HARQ process ID 1 is less than the value of the HARQ process ID 2, the user equipment determines that the NDI corresponding to the second TB (namely, the HARQ process ID 2) scheduled by the DCI is different from the NDI corresponding to the first TB. If the value of the HARQ process ID 1 is greater than the value of the HARQ process ID 2, the user equipment determines that the NDI corresponding to the second TB (namely, the HARQ process ID 2) scheduled by the DCI is the same as the NDI corresponding to the first TB (or the HARQ process ID 1).

For example, when N=4, M1=5, and in the DCI, the M1 bits indicate a HARQ process ID and an NDI for one transport block TB scheduled by the DCI or indicate a HARQ process ID or an NDI for each of two TBs scheduled by the DCI. When the DCI schedules one TB, a value of a HARQ process ID of the TB ranges from 0 to 3, and a new data indicator of the TB needs to be indicated in the DCI. When the DCI schedules two TBs, a value of a HARQ process ID of one TB (which may also be referred to as the $1^{st}$ TB) ranges from 0 to 3, and a value of a HARQ process ID of the other TB (which may also be referred to as the $2^{nd}$ TB) ranges from 0 to 3 and is different from the value of the HARQ process of the previous TB, but the HARQ process ID of the $1^{st}$ TB is different from the HARQ process ID of the $2^{nd}$ TB. Respective NDIs for the two TBs need to be indicated in the DCI.

One of five bits in the DCI is an NDI for a first TB. For example, the first TB is one of Q TBs scheduled by the DCI. Q=1 or Q=2. Two of the five bits in the DCI indicate a HARQ process ID 1 in {0 to 3}, and other two of the five bits in the DCI indicate a HARQ process ID 2 in {0 to 3}. A value of the HARQ process ID 1 may be the same as a value of the HARQ process ID 2. Alternatively, a value of the HARQ process ID 1 may be different from a value of the HARQ process ID 2. A HARQ process number of one TB is the HARQ process ID 1, and a HARQ process number of another TB is the HARQ process ID 2.

If the value of the HARQ process ID 1 is the same as the value of the HARQ process ID 2, it indicates that the DCI schedules one TB, and a HARQ process ID of the TB=the HARQ process ID 1=the HARQ process ID 2. If the value of the HARQ process ID 1 is different from the value of the HARQ process ID 2, it indicates that the DCI schedules two TBs.

One bit in the DCI is used to indicate the NDI corresponding to the HARQ process ID 1 or the first TB. If the value of the HARQ process ID 1 is less than the value of the HARQ process ID 2, it indicates that an NDI for the other TB, other than the first TB, in two TBs scheduled by the DCI is the same as the NDI for the first TB, or an NDI for the HARQ process ID 2 is the same as an NDI for the HARQ process ID 1. If the value of the HARQ process ID 1 is greater than the value of the HARQ process ID 2, it indicates that an NDI for the other TB, other than the first TB, in two TBs scheduled by the DCI is different from the NDI for the first TB, or an NDI for the HARQ process ID 2 is different from an NDI for the HARQ process ID 1. For example, the first TB is the $1^{st}$ TB in two TBs scheduled by the DCI.

Alternatively, one bit in the DCI is used to indicate the NDI corresponding to the HARQ process ID 1 or the first TB. If the value of the HARQ process ID 1 is less than the value of the HARQ process ID 2, it indicates that an NDI for the other TB, other than the first TB, in two TBs scheduled by the DCI is different from the NDI for the first TB, or an NDI for the HARQ process ID 2 is different from an NDI for the HARQ process ID 1. If the value of the HARQ process ID 1 is greater than the value of the HARQ process ID 2, it indicates that an NDI for the other TB, other than the first TB, in two TBs scheduled by the DCI is the same as the NDI for the first TB, or an NDI for the HARQ process ID 2 is the same as an NDI for the HARQ process ID 1. For example, the first TB is the $1^{st}$ TB in two TBs scheduled by the DCI.

A base station determines a quantity of TBs scheduled by the DCI, a HARQ process ID of each scheduled TB, and an NDI for each scheduled TB. If the base station determines that the quantity of TBs scheduled by the DCI is equal to 1, the base station indicates an NDI for the TB by using one bit in the DCI, indicates the HARQ process ID 1 in the range {0 to 3} by using two bits in the DCI, and indicates the HARQ process ID 2 in the range {0 to 3} by using two bits in the DCI, and the HARQ process ID 1 is equal to the HARQ process ID 2.

If the base station determines that the quantity of TBs scheduled by the DCI is equal to 2, the base station indicates an NDI for a first TB by using one bit in the DCI, the first TB is one of two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2. The base station indicates the HARQ process ID 1 in the range {0 to 3} by using two bits in the DCI, and indicates the HARQ process ID 2 in the range {0 to 3} by using two bits in the DCI, and the HARQ process ID 1 is not equal to the HARQ process ID 2. If the base station determines that an NDI for the second TB is the same as the NDI for the first TB, the value of the HARQ process ID 1 is less than the value of the HARQ process ID 2; or if the base station determines that the NDI for the second TB is different from the NDI for the first TB, the value of the HARQ process ID 1 is greater than the value of the HARQ process ID 2. Alternatively, if the base station determines that an NDI for the second TB is the same as the NDI for the first TB, the value of the HARQ process ID 1 is greater than the value of the HARQ process ID 2; or if the base station determines that the NDI for the second TB is different from the NDI for the first TB, the value of the HARQ process ID 1 is less than the value of the HARQ process ID 2.

User equipment receives the downlink control information DCI sent by the base station. Five bits in the DCI indicate the quantity of TBs scheduled by the DCI. A HARQ process ID of each TB scheduled by the DCI is determined, and an NDI for each TB scheduled by the DCI is determined. One of the five bits in the DCI is an NDI for a first TB. For example, the first TB is one of Q TBs scheduled by the DCI. Q=1 or Q=2. Two of the five bits in the DCI indicate a HARQ process ID 1 in {0 to 3}, and other two of the five bits in the DCI indicate a HARQ process ID 2 in {0 to 3}. A value of the HARQ process ID 1 may be the same as a value of the HARQ process ID 2. Alternatively, a value of the HARQ process ID 1 may be different from a value of the HARQ process ID 2.

If the value of the HARQ process ID 1 is the same as the value of the HARQ process ID 2, the user equipment determines that the DCI schedules one TB, and a HARQ process ID of the TB=the HARQ process ID 1=the HARQ process ID 2. If the value of the HARQ process ID 1 is different from the value of the HARQ process ID 2, the user equipment determines that the DCI schedules two TBs. A first TB is one of the two TBs scheduled by the DCI, and a second TB is the other TB, other than the first TB, in the two scheduled TBs. A HARQ process number of the first TB is the HARQ process ID 1, and a HARQ process number of the second TB is the HARQ process ID 2.

Optionally, one of the five bits in the DCI indicates the NDI corresponding to the first TB (or the HARQ process ID 1); and the terminal device determines, based on the bit, the NDI corresponding to the first TB (or the HARQ process ID 1). If the value of the HARQ process ID 1 is less than the value of the HARQ process ID 2, the user equipment determines that the NDI corresponding to the second TB (namely, the HARQ process ID 2) scheduled by the DCI is the same as the NDI corresponding to the first TB. If the value of the HARQ process ID 1 is greater than the value of the HARQ process ID 2, the user equipment determines that the NDI corresponding to the second TB (namely, the HARQ process ID 2) scheduled by the DCI is different from the NDI corresponding to the first TB (or the HARQ process ID 1).

Alternatively, if the value of the HARQ process ID 1 is less than the value of the HARQ process ID 2, the user equipment determines that the NDI corresponding to the second TB (namely, the HARQ process ID 2) scheduled by the DCI is different from the NDI corresponding to the first TB. If the value of the HARQ process ID 1 is greater than the value of the HARQ process ID 2, the user equipment determines that the NDI corresponding to the second TB (namely, the HARQ process ID 2) scheduled by the DCI is the same as the NDI corresponding to the first TB (or the HARQ process ID 1).

The foregoing implementations may be combined with each other if there is no contradiction.

In the foregoing implementations, meanings of same or different values of NDIs are the same as meanings of same or different NDIs.

Signaling overheads can be effectively reduced by using the still another communication method provided in this embodiment of this application.

An enhanced machine type communication (eMTC) system and other evolved systems (Further eMTC, FeMTC; Even Further eMTC, eFeMTC; and additional MTC, AMTC) are systems derived from LTE. In Release 14 and earlier versions, these systems have been implemented (working in an inband mode) and have actually been deployed. A battery life of MTC UEs is usually expected to be ten years or longer. However, NR is about to be put into commercial use. Coexistence of NR and LTE will become an important scenario. In addition, it is more likely that NR will gradually replace LTE in future spectrum deployment. Considering that the deployed MTC UE still has a relatively long battery life, an MTC system and an NR system are likely to appear at the same time. Therefore, the MTC system works on an NR frequency band, and how to avoid interference between the MTC system and the NR system is an important problem that needs to be considered. In a downlink, because the LTE system includes a center direct current subcarrier and is not counted in a resource block (RB), the NR system does not include a center direct current subcarrier, and a channel grid of LTE and a channel grid of NR may not be aligned, RBs of LTE and NR are not aligned. To reduce reserved resources on an NR side, a subcarrier on which LTE is not aligned with NR in is punctured in an existing technology. However, a problem that has not been resolved in the existing technology is that puncturing is performed on edges of which frequency resources.

Based thereupon, this application provides a communication method. The method may be applied to the terminal device in the communication system shown in FIG. 1.

In an implementable manner, the terminal device receives first information. The first information is used to indicate a location for puncturing a first resource and a quantity of subcarriers, the first resource includes N RBs or M narrowbands, N is an integer greater than or equal to 1, and M is an integer greater than or equal to 1. For example, N=1 or M=1.

Optionally, a network device sends first information. The first information is used to indicate a location for puncturing a first resource and a quantity of subcarriers, the first resource includes N RBs or M narrowbands, N is an integer greater than or equal to 1, and M is an integer greater than or equal to 1. For example, N=1 or M=1.

Optionally, M or N narrowbands are configured by the network device. To be specific, the network device sends second information, where the second information is used to indicate M or N; and the terminal device receives the second information, and determines M or N based on the second information.

Optionally, the terminal device receives third information sent by the network device, where the third information is used to indicate that the first resource is N RBs or M narrowbands. The terminal device determines, based on the third information, that the first resource includes N RBs or M narrowbands. That is, in this case, the third information indicates a granularity of the first resource, and the granularity may be a narrowband or an RB.

Optionally, N or M is predefined or is determined based on a system bandwidth. For example, when the system bandwidth is 1.4 MHz or 6 RBs, N=6 or M=1.

For example, when the system bandwidth is 3 MHz or 15 RBs, N=6 or M=1. Optionally, the terminal device determines, based on the first information, whether one narrowband when the system bandwidth is 3 MHz is a narrowband numbered 0 or a narrowband numbered 1. Optionally, the network device sends fourth information, and the terminal device receives the fourth information, where the fourth information is used to indicate M narrowband positions. The fourth information when the system bandwidth is 3 MHz is used to indicate whether one narrowband is a narrowband numbered 0 or a narrowband numbered 1. In this case, user equipment determines, based on the fourth information, whether one narrowband when the system bandwidth is 3 MHz is a narrowband numbered 0 or a narrowband numbered 1.

For example, when the system bandwidth is 5 MHz or 25 RBs, N=12 or M=2. Optionally, the terminal device determines, based on the first information, whether two narrowbands when the system bandwidth is 5 MHz are narrowbands numbered 0 and 1 or narrowbands numbered 2 and 3. Optionally, the network device sends fourth information, and the terminal device receives the fourth information, where the fourth information is used to indicate M narrowband positions. When the system bandwidth is 5 MHz, the fourth information is used to indicate whether two narrowbands are narrowbands numbered 0 and 1 or narrowbands numbered 2 and 3. In this case, user equipment determines, based on the fourth information, whether two narrowbands when the system bandwidth is 5 MHz are narrowbands numbered 0 and 1 or narrowbands numbered 2 and 3.

For example, when the system bandwidth is 10 MHz or 50 RBs, N=48 or M=8. Optionally, the terminal device determines, based on the first information, eight narrowbands when the system bandwidth is 10 MHz are narrowbands numbered 0, 1, 2, 3, 4, 5, 6, and 7. Optionally, the network device sends fourth information, and the terminal device receives the fourth information, where the fourth information is used to indicate M narrowband positions. The fourth information is used to indicate that eight narrowbands when the system bandwidth is 10 MHz are narrowbands numbered 0, 1, 2, 3, 4, 5, 6, and 7. In this case, user equipment determines, based on the fourth information, that eight narrowbands when the system bandwidth is 10 MHz are narrowbands numbered 0, 1, 2, 3, 4, 5, 6, and 7.

For example, when the system bandwidth is 15 MHz or 75 RBs, N=36 or M=6. Optionally, the terminal device determines, based on the first information, whether six narrowbands when the system bandwidth is 15 MHz are narrowbands numbered 0, 1, 2, 3, 4, and 5 or narrowbands numbered 6, 7, 8, 9, 10, and 11. Optionally, the network device sends fourth information, and the terminal device receives the fourth information, where the fourth information is used to indicate M narrowband positions. The fourth information is used to indicate whether six narrowbands when the system bandwidth is 15 MHz are narrowbands numbered 0, 1, 2, 3, 4, and 5 or narrowbands numbered 6, 7, 8, 9, 10, and 11. In this case, user equipment determines, based on the fourth information, whether six narrowbands when the system bandwidth is 15 MHz are narrowbands numbered 0, 1, 2, 3, 4, and 5 or narrowbands numbered 6, 7, 8, 9, 10, and 11.

For example, when the system bandwidth is 20 MHz or 100 RBs, N=96 or M=16. Optionally, the terminal device determines, based on the first information, that 16 narrowbands when the system bandwidth is 20 MHz are narrowbands numbered 0, 1, 2, 3, 4, 5, 6, 7, 8, 9, 10, 11, 12, 13, 14, and 15. Optionally, the network device sends fourth information, and the terminal device receives the fourth information, where the fourth information is used to indicate M narrowband positions. The fourth information is used to indicate that 16 narrowbands when the system bandwidth is 20 MHz are narrowbands numbered 0, 1, 2, 3, 4, 5, 6, 7, 8, 9, 10, 11, 12, 13, 14, and 15. In this case, user equipment determines, based on the fourth information, 16 narrowbands when the system bandwidth is 20 MHz are narrowbands numbered 0, 1, 2, 3, 4, 5, 6, 7, 8, 9, 10, 11, 12, 13, 14, and 15.

The foregoing implementations may be combined with each other if there is no contradiction.

In an existing technology, one piece of DCI is allowed to schedule a plurality of transport blocks (transmission block). For a user terminal in a coverage enhancement mode B, a maximum of four TBs can be scheduled. In an existing technology, ten bits are used to indicate an NDI, a HARQ process number, a quantity of scheduled TBs, and an MCS. However, there is no corresponding way to describe and interpret simply and clearly.

Based thereupon, this application provides a communication method. The method may be applied to the terminal device in the communication system shown in FIG. 1.

In an exemplary embodiment, the present application provides an information processing method, including:

receiving, by a terminal device, downlink control information from a network device, wherein the downlink control information is capable of scheduling a maximum of N transport blocks TBs, N is a positive integer, and the downlink control information comprises a first bit and a second bit, wherein the first bit comprises M bits, the second bit comprises P bits, and M and P are integers greater than or equal to 1;

determining, by the terminal device based on the second bit, a quantity L of TBs scheduled by the downlink control information; determining, by the terminal device based on the first bit, at least one of hybrid automatic retransmission request HARQ process numbers corresponding to the L TBs and new data indicator NDI information of the L TBs; and determining, by the terminal device based on the second bit and/or the first bit, a modulation and demodulation scheme MCS; and transmitting, by the terminal device, information based on the quantity L of scheduled TBs, the HARQ process number corresponding to the L TBs, NDIs corresponding to the L TBs, and the MCS.

In a further embodiment, the determining, by the terminal device based on the second bit, a quantity L of TBs scheduled by the downlink control information comprises:

determining, by the terminal device based on a value obtained after performing a remainder operation on a first value V corresponding to the second bit with respect to 3, the quantity L of TBs scheduled by the downlink control information.

In a further embodiment, the value obtained after performing the remainder operation on the first value V corresponding to the second bit with respect to 3 is 0, and L=1 or 2;

the value obtained after performing the remainder operation on the first value V corresponding to the second bit with respect to 3 is 1, and L=3; and/or the value obtained after performing the remainder operation on the first value V corresponding to the second bit with respect to 3 is 2, and L=4.

In a further embodiment,

L=1 or 2, two bits in the first bit are used to indicate a first HARQ process number, other two bits in the first bit are used to indicate a second HARQ process number, and other one bit in the first bit is used to indicate an NDI corresponding to a first TB; and when the first HARQ process number is equal to the second HARQ process number, L=1;

when the first HARQ process number is greater than the second HARQ process number, L=2, a HARQ process number corresponding to a second TB, other than the first TB, in two TBs is the larger HARQ process number between the first HARQ process number and the second HARQ process number, an NDI corresponding to the second TB is 0, and a HARQ process number corresponding to the first TB is the smaller HARQ process number between the first HARQ process number and the second HARQ process number; or when the first HARQ process number is less than the second HARQ process number, L=2, a HARQ process number corresponding to a second TB, other than the first TB, in two TBs is the larger HARQ process number between the first HARQ process number and the second HARQ process number, an NDI corresponding to the second TB is 1, and a HARQ process number corresponding to the first TB is the smaller HARQ process number between the first HARQ process number and the second HARQ process number.

In a further embodiment,

L=1 or 2, two bits in the first bit are used to indicate a first HARQ process number, other two bits in the first bit are used to indicate a second HARQ process number, and other one bit in the first bit is used to indicate an NDI corresponding to a first TB; and when the first HARQ process number is equal to the second HARQ process number, L=1;

when the first HARQ process number is greater than the second HARQ process number, L=2, a HARQ process number corresponding to a second TB, other than the first TB, in two TBs is the larger HARQ process number between the first HARQ process number and the second HARQ process number, an NDI corresponding to the second TB is 1, and a HARQ process number corresponding to the first TB is the smaller HARQ process number between the first HARQ process number and the second HARQ process number; or when the first HARQ process number is less than the second HARQ process number, L=2, a HARQ process number corresponding to a second TB, other than the first TB, in two TBs is the larger HARQ process number between the first HARQ process number and the second HARQ process number, an NDI corresponding to the second TB is 0, and a HARQ process number corresponding to the first TB is the smaller HARQ process number between the first HARQ process number and the second HARQ process number.

In a further embodiment, when L=3, two bits in the first bit are used to indicate a third HARQ process number, other three bits in the first bit are used to indicate the NDIs corresponding to the L TBs, and the third HARQ process number is a HARQ process number that is not scheduled; and/or when L=4, four bits in the first bit are used to indicate the NDIs corresponding to the L TBs.

In a further embodiment, when L=3, two bits in the first bit are used to indicate the HARQ process numbers corresponding to the L TBs, and other three bits in the first bit are used to indicate the NDIs corresponding to the L TBs; and/or when L=4, four bits in the first bit are used to indicate the NDIs corresponding to the L TBs.

In a further embodiment, the determining, by the terminal device based on the second bit and/or the first bit, a modulation and demodulation scheme MCS comprises:

determining, by the terminal device, an MCS index based on a value obtained after performing a rounding down operation on the first value V corresponding to the second bit with respect to 3; or when L=1, 2, or 3, determining, by the terminal device, an MCS index based on a value obtained after performing a rounding down operation on the first value V corresponding to the second bit with respect to 3.

In a further embodiment, when L=4, one bit in the first bit is used to indicate that the MCS index is 10 or indicate that the MCS index is determined based on the value obtained after performing the rounding down operation on the first value V corresponding to the second bit with respect to 3.

In a further embodiment, the determining, by the terminal device based on the second bit and/or the first bit, a modulation and demodulation scheme MCS comprises:

determining, by the terminal device, a first offset value based on one bit in the first bit, wherein the first offset value is an integer greater than or equal to 0; and determining, by the terminal device, the MCS index based on the first offset value and the first value V that corresponds to the second bit.

In a further embodiment, N=4; and/or

M=5 and P=5.

In an exemplary embodiment, the present application provides an information processing method, including:

sending, by a network device, downlink control information to a terminal device, wherein the downlink control information is capable of scheduling a maximum of N TBs, the downlink control information comprises a first bit and a second bit, the first bit comprises M bits, the second bit comprises P bits, and M and P are integers greater than or equal to 1, wherein the second bit is used to indicate a quantity L of TBs scheduled by the downlink control information, N and L are positive integers, and 1≤L≤N; the first bit is used to indicate at least one of hybrid automatic retransmission request HARQ process numbers corresponding to the L TBs and new data indicator NDI information of the L TBs; and the second bit and/or the first bit is used to indicate a modulation and demodulation scheme (MCS); and transmitting, by the network device, information based on the quantity L of scheduled TBs, the HARQ process number corresponding to the L TBs, NDIs corresponding to the L TBs, and the MCS.

In a further embodiment, the first bit comprises one or more fields, and the second bit comprises one or more fields.

In a further embodiment, the second bit indicates, by using a value obtained after performing a remainder operation on a first value V corresponding to the second bit with respect to 3, the quantity L of TBs scheduled by the downlink control information.

In a further embodiment, L=1 or 2, and the value obtained after performing the remainder operation on the first value V corresponding to the second bit with respect to 3 is 0; and/or L=3, and the value obtained after performing the remainder operation on the first value V corresponding to the second bit with respect to 3 is 1; and/or L=4, and the value obtained after performing the remainder operation on the first value V corresponding to the second bit with respect to 3 is 2.

In a further embodiment, L=1 or 2, two bits in the first bit are used to indicate a first HARQ process number, other two bits in the first bit are used to indicate a second HARQ process number, and other one bit in the first bit is used to indicate an NDI corresponding to a first TB; and when it is determined that L=1, the first HARQ process number is equal to the second HARQ process number;

when it is determined that L=2, a HARQ process number corresponding to a second TB, other than the first TB, in two TBs is the larger HARQ process number between the first HARQ process number and the second HARQ process number; or when an NDI corresponding to the second TB is 0, the first HARQ process number is greater than the second HARQ process number, and a HARQ process number corresponding to the first TB is the smaller HARQ process number between the first HARQ process number and the second HARQ process number; or when it is determined that L=2, a HARQ process number corresponding to a second TB, other than the first TB, in two TBs is the larger HARQ process number between the first HARQ process number and the second HARQ process number; or when an NDI corresponding to the second TB is 1, the first HARQ process number is less than the second HARQ process number, and a HARQ process number corresponding to the first TB is the smaller HARQ process number between the first HARQ process number and the second HARQ process number.

In a further embodiment,

L=1 or 2, two bits in the first bit are used to indicate a first HARQ process number, other two bits in the first bit are used to indicate a second HARQ process number, and other one bit in the first bit is used to indicate an NDI corresponding to a first TB; and when it is determined that L=1, the first HARQ process number is equal to the second HARQ process number;

when it is determined that L=2, a HARQ process number corresponding to a second TB, other than the first TB, in two TBs is the larger HARQ process number between the first HARQ process number and the second HARQ process number; or when an NDI corresponding to the second TB is 1, the first HARQ process number is greater than the second HARQ process number, and a HARQ process number corresponding to the first TB is the smaller HARQ process number between the first HARQ process number and the second HARQ process number; or when it is determined that L=2, a HARQ process number corresponding to a second TB, other than the first TB, in two TBs is the larger HARQ process number between the first HARQ process number and the second HARQ process number; or when an NDI corresponding to the second TB is 0, the first HARQ process number is less than the second HARQ process number, and a HARQ process number corresponding to the first TB is the smaller HARQ process number between the first HARQ process number and the second HARQ process number.

In a further embodiment, when L=3, two bits in the first bit are used to indicate a third HARQ process number, other three bits in the first bit are used to indicate the NDIs corresponding to the L TBs, and the third HARQ process number is a HARQ process number that is not scheduled; and/or when L=4, four bits in the first bit are used to indicate the NDIs corresponding to the L TBs.

In a further embodiment, when L=3, two bits in the first bit are used to indicate the HARQ process numbers corresponding to the L TBs, and other three bits in the first bit are used to indicate the NDIs corresponding to the L TBs; and/or when L=4, four bits in the first bit are used to indicate the NDIs corresponding to the L TBs.

In a further embodiment, the second bit and/or the first bit indicates an MCS index by using a value obtained after performing a rounding down operation on the first value V corresponding to the second bit with respect to 3; or when L=1, 2, or 3, the second bit and/or the first bit indicates an MCS index by using a value obtained after performing a rounding down operation on the first value V corresponding to the second bit with respect to 3.

In a further embodiment, when L=4, one bit in the first bit is used to indicate that the MCS index is 10 or indicate that the MCS index is determined based on the value obtained after performing the rounding down operation on the first value V corresponding to the second bit with respect to 3.

In a further embodiment, N=4; and/or

M=5 and P=5.

Exemplary embodiments may be as follows:

A1: the network device sends the downlink control information to the terminal device.

The downlink control information is capable of scheduling a maximum of N TBs, and the downlink control information includes a first bit and a second bit. The first bit includes M bits, the second bit includes P bits, and M and P are integers greater than or equal to 1. The second bit is used to indicate a quantity L of TBs scheduled by the downlink control information, N and L are positive integers, and 1≤L≤N. The first bit is used to indicate hybrid automatic retransmission request HARQ process numbers corresponding to the L TBs and new data indicator NDI information of the L TBs. The second bit and/or the first bit is used to indicate a modulation and demodulation scheme (MCS).

Before step A1, the network device may determine the quantity L of transport blocks TBs scheduled by the downlink control information, the hybrid automatic retransmission request HARQ process numbers corresponding to the L TBs, the new data indicator NDI information of the L TBs, and the MCS.

A2: the terminal device receives the downlink control information from the network device, where the downlink control information is capable of scheduling a maximum of N transport blocks TBs, and N is a positive integer, for example, N=4. The downlink control information includes a first bit and a second bit. Herein, the first bit includes one or more fields, and the second bit includes one or more fields. For example, the first bit includes five bits, and the second bit includes five bits.

A3: the terminal device determines, based on the second bit, the quantity L of TBs (which may also be referred to as a quantity of HARQ processes) scheduled by the downlink control information; determines, based on the first bit, the hybrid automatic retransmission request HARQ process numbers corresponding to the L TBs (which may also be referred to as L HARQ processes) and the new data indicator NDI information of the L TBs (which may also be referred to as L HARQ processes); and determines, based on the second bit, the modulation and demodulation scheme (MCS) or an MCS index.

A4: the network device and the terminal device transmit information based on the quantity L of scheduled TBs, the HARQ process numbers corresponding to the L TBs, the NDIs corresponding to the L TBs, and the MCS.

Herein, transmission of the information performed by the terminal device may be understood as receiving the information. In this case, transmission of the information on a network device side may be understood as sending the information. Alternatively, transmission of the information performed by the terminal device is understood as sending the information. In this case, transmission of the information performed by the network device may be understood as receiving the information.

For example, the information transmitted by the network device or the terminal device may be a PDSCH or a PUSCH.

Optionally, the second bit may indicate, by using a value obtained after performing a remainder operation on a first value V corresponding to the second bit with respect to 3, the quantity L of TBs scheduled by the downlink control information. Therefore, the terminal device may determine, based on the value obtained after performing the remainder operation on the first value V corresponding to the second bit with respect to 3, the quantity of TBs scheduled by the downlink control information. To be specific, the quantity of scheduled TBs is determined based on a value obtained by performing a modulo operation on the first value V corresponding to the indexes indicated by all bits in the second bit or the first value V corresponding to states of all bits in the second bit with respect to 3. For example, v mode 3 represents that the quantity of scheduled TBs (or the quantity of HARQ processes) is determined based on a remainder obtained after the operation of v/3. For example, the value obtained after performing the remainder operation on the first value V corresponding to the second bit with respect to 3 is 0, and L=1 or 2. For another example, the value obtained after performing the remainder operation on the first value V corresponding to the second bit with respect to 3 is 1, and L=3. For another example, the value obtained after performing the remainder operation on the first value V corresponding to the second bit with respect to 3 is 2, and L=4. That is, after the modulo operation on the first value with respect to 3, there are three values: 0, 1, and 2. The three values respectively correspond to three values of L: 1 (or 2), 3, and 4. In this embodiment of this application, a correspondence between three values obtained after performing a modulo operation on the first value with respect to 3 and three values of L is not limited, provided that the values obtained after performing the modulo operation on the first value V indicate the three values of L: L={1 or 2}, L={3}, and L={4}.

Optionally, L=1 or 2, two bits in the first bit are used to indicate a first HARQ process number, other two bits in the first bit are used to indicate a second HARQ process number, and other one bit in the first bit is used to indicate an NDI corresponding to a first TB. In this case, because one or two TBs are scheduled, there is at least one TB.

Optionally, when the first HARQ process number is equal to the second HARQ process number, L=1; when the first HARQ process number is greater than the second HARQ process number, L=2, a HARQ process number corresponding to a second TB, other than the first TB, in two TBs is the larger HARQ process number between the first HARQ process number and the second HARQ process number, an NDI corresponding to the second TB is 1, and a HARQ process number corresponding to the first TB is the smaller HARQ process number between the first HARQ process number and the second HARQ process number; or when the first HARQ process number is less than the second HARQ process number, L=2, a HARQ process number corresponding to a second TB, other than the first TB, in two TBs is the larger HARQ process number between the first HARQ process number and the second HARQ process number, an NDI corresponding to the second TB is 0, and a HARQ process number corresponding to the first TB is the smaller HARQ process number between the first HARQ process number and the second HARQ process number.

Optionally, when the first HARQ process number is equal to the second HARQ process number, L=1; when the first HARQ process number is greater than the second HARQ process number, L=2, a HARQ process number corresponding to a second TB, other than the first TB, in two TBs is the larger HARQ process number between the first HARQ process number and the second HARQ process number, an NDI corresponding to the second TB is 0, and a HARQ process number corresponding to the first TB is the smaller HARQ process number between the first HARQ process number and the second HARQ process number; or when the first HARQ process number is less than the second HARQ process number, L=2, a HARQ process number corresponding to a second TB, other than the first TB, in two TBs is the larger HARQ process number between the first HARQ process number and the second HARQ process number, an NDI corresponding to the second TB is 1, and a HARQ process number corresponding to the first TB is the smaller HARQ process number between the first HARQ process number and the second HARQ process number.

Optionally, when L=3, two bits in the first bit are used to indicate a third HARQ process number, other three bits in the first bit are used to indicate the NDIs corresponding to the L TBs, and the third HARQ process number is a HARQ process number that is not scheduled. In other words, there are a total of four HARQ processes, L=3, that is, three HARQ processes are scheduled. Therefore, one remaining HARQ process is not scheduled. As a result, in this case, that HARQ processes corresponding to remaining three HARQ process numbers are scheduled is known only by indicating the HARQ process number that is not scheduled. In this way, indication can be performed more flexibly, coding complexity of a user terminal and a base station is reduced, and power consumption is reduced.

Optionally, when L=4, four bits in the first bit are used to indicate the NDIs corresponding to the L TBs. In this case, there are a total of five bits in the first bit, and the first four bits or four bits in other positions may be selected to indicate the NDIs.

Optionally, when L=3, two bits in the first bit are used to indicate the HARQ process numbers corresponding to the L TBs, and other three bits in the first bit are used to indicate the NDIs corresponding to the L TBs. In this case, three scheduled HARQ processes are indicated in four HARQ processes, and one has four possibilities. Therefore, two bits are used for indication. For example, Table 8 may be used for indication. It should be noted that the content is within the protection scope of this application provided that three HARQ process numbers are indicated by using four bit states of two bits. This is not specifically limited. For example, three scheduled HARQ process numbers are indicated in {012, 013, 023, 123}.

TABLE 8

| States of two bits in the first bit | 00 | 01 | 10 | 11 |
|---|---|---|---|---|
| Three scheduled HARQ process numbers | 0, 1, 2 | 0, 2, 3 | 0, 1, 3 | 1, 2, 3 |

It should be understood that Table 8 is merely an example description, and a correspondence between the states of the two bits in the first bits and the three scheduled HARQ process numbers is not specifically limited.

Optionally, the second bit and/or the first bit may indicate an MCS index by using a value obtained after performing a rounding down operation on the first value V corresponding to the second bit with respect to 3. Therefore, the terminal device determines the MCS index based on the value obtained after performing the rounding down operation on the first value V corresponding to the second bit with respect to 3. That is, in this case, rounding down is performed on V with respect to 3, namely, floor(V/3), where floor(x) represents an integer not greater than x. A value obtained after the rounding down is used to determine the MCS index.

Alternatively, when L=1, 2, or 3, the second bit and/or the first bit may indicate an MCS index by using a value obtained after performing a rounding down operation on the first value V corresponding to the second bit with respect to 3. Therefore, when L=1, 2, or 3, the terminal device determines the MCS index based on the value obtained after performing the rounding down operation on the first value V corresponding to the second bit with respect to 3. That is, in this case, rounding down is performed on V with respect to 3, namely, floor(V/3), where floor(x) represents an integer not greater than x. A value obtained after the rounding down is used to determine the MCS index.

Optionally, when L=4, one bit in the first bit is used to indicate that the MCS index is 10 or indicate that the MCS index is determined based on the value obtained after performing the rounding down operation on the first value V corresponding to the second bit with respect to 3. For example, one bit, other than four NDI indication bits, in the first bit is used to indicate that the MCS index is 10 or indicate that the MCS index is determined based on the value obtained after performing the rounding down operation on the first value V corresponding to the second bit with respect to 3. For example, when the bit is 0, it indicates that the MCS index is determined based on the value obtained after performing the rounding down operation on the first value V corresponding to the second bit with respect to 3; and when the bit is 1, it indicates that the MCS index is 10.

Optionally, when L=4, one bit in the first bit is used to indicate a first offset value. The first offset value is an integer greater than or equal to 0, for example, 0 or 1. The MCS index is determined based on the first offset value and a first value V that corresponds to the second bit. For example, the MCS index is determined based on a value obtained after performing the rounding down operation on a sum of the first value V corresponding to the second bit and the first offset value Z with respect to 3. For example, one bit, other than four NDI indication bits, in the first bit is used to indicate that the first offset value is Z, where Z=0 or Z=1, and the MCS index is determined based on the value obtained after performing the rounding down operation on V+Z with respect to 3, that is, the MCS index is determined based on floor (Z+V).

Table 9 is an example of the method, bits B0 to B4 represent a first bit, and V is a number indicated by five bits in a second bit and ranges from 0 to 31. M0 bits in a first field are used to indicate that the MCS index is 10 or indicate that the MCS index is determined based on the value obtained after performing the rounding down operation on the first value V corresponding to the second bit with respect to 3. H0 represents a first HARQ process number, H2 represents a second HARQ process number, N0 represents an NDI corresponding to a first TB, and N1, N2, and N3 represent NDIs corresponding to a second TB, a third TB, and a fourth TB that are scheduled. Hx represents a HARQ process number that is not scheduled or three HARQ process numbers that are scheduled. Imcs represents an MCS index.

TABLE 9

| Quantity of TBs | Vmod3= | B0 | B1 | B2 | B3 | B4 | Imcs |
|---|---|---|---|---|---|---|---|
| 1 to 2 | 0 |  | H0 |  | H1 | N0 | floor |
| 3 | 1 |  | Hx | N0 | N1 | N2 | (V/3) |
| 4 | 2 | N0 | N1 | N2 | N3 | M0 |  |

Table 10 is an example of the method, bits B0 to B4 represent a first bit, and V is a number indicated by five bits in a second bit and ranges from 0 to 31. H0 represents a first HARQ process number, H2 represents a second HARQ process number, N0 represents an NDI corresponding to a first TB, and N1, N2, and N3 represent NDIs corresponding to a second TB, a third TB, and a fourth TB that are scheduled. Hx represents a HARQ process number that is not scheduled or three HARQ process numbers that are scheduled. Imcs represents an MCS index.

TABLE 10

| Quantity of TBs | Vmod3= | B0 | B1 | B2 | B3 | B4 | Imcs |
|---|---|---|---|---|---|---|---|
| 1 to 2 | 0 |  | H0 |  | H1 | N0 | floor |
| 3 | 1 |  | Hx | N0 | N1 | N2 | (V/3) |
| 4 | 2 | N0 | N1 | N2 | N3 |  |  |

The following gives a definition of an $i^{th}$ TB in this application. DCI indicates or schedules N HARQ processes, and the N HARQ process numbers are arranged in ascending order. It is assumed that HARQ process numbers obtained after the N HARQ process numbers are sorted in ascending (or descending) order are M(0), M(1), . . . , and M(N−1). A HARQ process number of the $i^{th}$ TB is M(i−1), where i=1, . . . , or N.

The implementations of this application may be combined with each other if there is no contradiction.

In the implementations of this specification, a value corresponding to a bit may be a value indicated by the bit, or may be a decimal value obtained by converting a binary value of the bit. This is not specifically limited herein.

By using the foregoing communication method, indication can be performed more flexibly, coding complexity of a user terminal and a base station is reduced, and power consumption is reduced.

This application further provides another communication method to resolve the following problem: in an existing technology, one piece of DCI is allowed to schedule a plurality of transport blocks (transmission block). For a user terminal in a coverage enhancement mode B, a maximum of four TBs can be scheduled. In an existing technology, ten bits are used to indicate an NDI, a HARQ process number, a quantity of scheduled TBs, and an MCS. However, there is no corresponding way to describe and interpret simply and clearly. The method may be applied to the terminal device in the communication system shown in FIG. 1. The following describes the method from a first node side. The method includes:

A first node sends downlink control information to a second node. The first node indicates a quantity of TBs scheduled by the downlink control information, a HARQ process number corresponding to each TB, an NDI for each TB, and an MCS index. There are a total of 11 or 10 MCS indexes. The downlink control information includes a third bit and a fourth bit. The third bit includes five bits, and the fourth bit includes five bits. A value indicated by the third bit is used to indicate the MCS index and the quantity of scheduled TBs.

A value V indicated by the third bit is used to indicate an MCS index Imcs, where V=Imcs*3. The value V indicated by the third bit is further used to determine the quantity of scheduled TBs. Alternatively, the value V indicated by the third bit and an offset value Z indicated by one bit in the fourth bit are used to indicate an MCS index Imcs, where V+Z=Imcs*3. The value V indicated by the third bit is further used to determine the quantity of scheduled TBs.

For example, if the DCI schedules one TB or two TBs, the value V indicated by the third bit is a multiple of 3. One bit in the fourth bit is used to indicate an NDI corresponding to the $1^{st}$ TB, other two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If the DCI schedules one TB, H0=H1, and a HARQ process number of the TB is H0. If the DCI schedules two TBs, H0≠H1, and HARQ process numbers of two TBs are H0 and H1. If an NDI for the $2^{nd}$ TB is equal to 0, H0<H1; and if an NDI for the $2^{nd}$ TB is equal to 1, H0>H1. Alternatively, if an NDI for the $2^{nd}$ TB is equal to 0, H0>H1; and if an NDI for the $2^{nd}$ TB is equal to 1, H0<H1.

For example, if the DCI schedules one TB or two TBs, the value V indicated by the third bit is equal to 3m, where m is 0 or a positive integer. One bit in the fourth bit is used to indicate an NDI corresponding to the $1^{st}$ TB, two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If the DCI schedules one TB, H0=H1, and a HARQ process number of the TB is H0. If an NDI for the $2^{nd}$ TB is the same as an NDI for the $1^{st}$ TB, H0<H1; if an NDI for the $2^{nd}$ TB is equal to 0, H0<H1; and if an NDI for the $2^{nd}$ TB is equal to 1, H0>H1. Alternatively, if an NDI for the $2^{nd}$ TB is equal to 0, H0>H1; and if an NDI for the $2^{nd}$ TB is equal to 1, H0<H1.

For example, if the DCI schedules one TB or two TBs, the value V indicated by the third bit is equal to 3m+1, where m is 0 or a positive integer. One bit in the fourth bit is used to indicate an NDI corresponding to the $1^{st}$ TB, two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If the DCI schedules one TB, H0=H1, and a HARQ process number of the TB is H0. If an NDI for the $2^{nd}$ TB is equal to 0, H0<H1; and if an NDI for the $2^{nd}$ TB is equal to 1, H0>H1. Alternatively, if an NDI for the $2^{nd}$ TB is equal to 0, H0>H1; and if an NDI for the $2^{nd}$ TB is equal to 1, H0<H1.

For example, if the DCI schedules one TB or two TBs, the value V indicated by the third bit is equal to 3m+2, where m is 0 or a positive integer. One bit in the fourth bit is used to indicate an NDI corresponding to the $1^{st}$ TB, two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If the DCI schedules one TB, H0=H1, and a HARQ process number of the TB is H0. If an NDI for the $2^{nd}$ TB is equal to 0, H0<H1; and if an NDI for the $2^{nd}$ TB is equal to 1, H0>H1. Alternatively, if an NDI for the $2^{nd}$ TB is equal to 0, H0>H1; and if an NDI for the $2^{nd}$ TB is equal to 1, H0<H1.

For example, if the DCI schedules three TBs, the value V indicated by the third bit is equal to 3m+1, where m is 0 or a positive integer. Three bits in the fourth bit are respectively used to indicate NDIs for three TBs. Two bits in the fourth bit indicate three HARQ process numbers H2 corresponding to three TBs. For example, H2 is indicated in {012, 013, 023, 123}. Alternatively, two bits in the fourth bit indicate a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

For example, if the DCI schedules three TBs, the value V indicated by the third bit is equal to 3m, where m is 0 or a positive integer. Three bits in the fourth bit are respectively used to indicate NDIs for three TBs. Two bits in the fourth bit indicate three HARQ process numbers H2 corresponding to three TBs. For example, H2 is indicated in {012, 013, 023, 123}. Alternatively, two bits in the fourth bit indicate a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

For example, if the DCI schedules three TBs, the value V indicated by the third bit is equal to 3m+2, where m is 0 or a positive integer. Three bits in the fourth bit are respectively used to indicate NDIs for three TBs. Two bits in the fourth bit indicate three HARQ process numbers H2 corresponding to three TBs. For example, H2 is indicated in {012, 013, 023, 123}. Alternatively, two bits in the fourth bit indicate a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

For example, if the DCI schedules four TBs, the value V indicated by the third bit is equal to 3m, where m is 0 or a positive integer. HARQ process numbers corresponding to the four TBs are 0, 1, 2, and 3. Four bits in the fourth bit are respectively used to indicate NDIs corresponding to the four TBs.

For example, if the DCI schedules four TBs, the value V indicated by the third bit is equal to 3m+1, where m is 0 or a positive integer. HARQ process numbers corresponding to the four TBs are 0, 1, 2, and 3. Four bits in the fourth bit are respectively used to indicate NDIs corresponding to the four TBs.

For example, if the DCI schedules four TBs, the value V indicated by the third bit is equal to 3m+2, where m is 0 or a positive integer. HARQ process numbers corresponding to the four TBs are 0, 1, 2, and 3. Four bits in the fourth bit are respectively used to indicate NDIs corresponding to the four TBs.

Optionally, when L=4, one bit in the fourth bit is used to indicate that the MCS index is 10 or indicate that the MCS index is determined based on the value obtained after performing the rounding down operation on the first value V corresponding to the third bit with respect to 3. For example, one bit, other than four NDI indication bits, in the fourth bit is used to indicate that the MCS index is 10 or indicate that the MCS index is determined based on the value obtained after performing the rounding down operation on the first value V corresponding to the third bit with respect to 3. For example, when the bit is 0, it indicates that the MCS index is determined based on the value obtained after performing the rounding down operation on the first value V corresponding to the third bit with respect to 3; and when the bit is 1, it indicates that the MCS index is 10.

Optionally, when L=4, one bit in the fourth bit is used to indicate a first offset value. The first offset value is an integer greater than or equal to 0, for example, 0 or 1. The MCS index is determined based on the first offset value and a first value V that corresponds to the third bit. For example, the MCS index is determined based on a value obtained after performing the rounding down operation on a sum of the first value V corresponding to the third bit and the first offset value Z with respect to 3. For example, one bit, other than four NDI indication bits, in the fourth bit is used to indicate that the first offset value is Z, where Z=0 or Z=1, and the MCS index is determined based on the value obtained after performing the rounding down operation on V+Z with respect to 3, that is, the MCS index is determined based on floor(Z+V).

For example, another indication method is illustrated below. In the following table, N1 is an NDI for a TB i or an $(i+1)^{th}$ TB, where a value of i is 0, 1, 2, or 3. For example, in the following table, V is a value indicated by a third bit, and floor is the rounding down operation. A fourth bit includes four bits: b0, b1, b2, and b3.

Table 11 is an example of the method, bits B0 to B4 represent the fourth bit, and V is a number indicated by five bits in the third bit and ranges from 0 to 31. H0 represents a first HARQ process number, H2 represents a second HARQ process number, N0 represents an NDI corresponding to a first TB, and N1, N2, and N3 represent NDIs corresponding to a second TB, a third TB, and a fourth TB that are scheduled. Hx represents a HARQ process number that is not scheduled or three HARQ process numbers that are scheduled. Imcs represents an MCS index.

TABLE 11

| Quantity of TBs | Vmod3= | B0 | B1 | B2 | B3 | B4 | Imcs |
|---|---|---|---|---|---|---|---|
| 1 to 2 | 0 |  | H0 |  | H1 | N0 | floor |
| 3 | 1 |  | Hx | N0 | N1 | N2 | (V/3) |
| 4 | 2 | N0 | N1 | N2 | N3 |  |  |

Table 12 is an example of the method, bits B0 to B4 represent the fourth bit, and V is a number indicated by five bits in the third bit and ranges from 0 to 31. M0 bits in a first field are used to indicate that the MCS index is 10 or indicate that the MCS index is determined based on the value obtained after performing the rounding down operation on the first value V corresponding to the fourth bit with respect to 3. H0 represents a first HARQ process number, H2 represents a second HARQ process number, N0 represents an NDI corresponding to a first TB, and N1, N2, and N3 represent NDIs corresponding to a second TB, a third TB, and a fourth TB that are scheduled. Hx represents a HARQ process number that is not scheduled or three HARQ process numbers that are scheduled. Imcs represents an MCS index.

TABLE 12

| Quantity of TBs | Vmod3= | B0 | B1 | B2 | B3 | B4 | Imcs |
|---|---|---|---|---|---|---|---|
| 1 to 2 | 0 |  | H0 |  | H1 | N0 | floor |
| 3 | 1 |  | Hx | N0 | N1 | N2 | (V/3) |
| 4 | 2 | N0 | N1 | N2 | N3 | M0 |  |

The following describes the method from a second node side. The method includes:

A second node receives downlink control information sent by a first node. The second node determines a quantity of scheduled TBs, a HARQ process number corresponding to each TB, an NDI for each TB, and an MCS index by using the received downlink control information. There are a total of 11 or 10 MCS indexes. The downlink control information includes a third bit and a fourth bit. The third bit includes five bits, and the fourth bit includes five bits. The second node further determines the quantity of scheduled TBs based on a value indicated by the third bit.

The second node determines an MCS index Imcs based on a value V indicated by the third bit, where V=Imcs*5. The second node further determines the quantity of scheduled TBs based on the value V indicated by the third bit. Alternatively, the value V indicated by the third bit and an offset value Z indicated by one bit in the fourth bit are used to indicate an MCS index Imcs, where V+Z=Imcs*3. The value V indicated by the third bit is further used to determine the quantity of scheduled TBs.

For example, if the value V indicated by the third bit is a multiple of 3, the DCI schedules one TB or two TBs. One bit in the fourth bit is used to indicate an NDI corresponding to the $1^{st}$ TB, other two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If H0=H1, the DCI schedules one TB, and a HARQ process number of the TB is H0. If H0≠H1, the DCI schedules two TBs, and HARQ process numbers of the two TBs are H0 and H1. If H0<H1, an NDI for the $2^{nd}$ TB is equal to 0; and if H0>H1, an NDI for the $2^{nd}$ TB is equal to 1. Alternatively, if H0<H1, an NDI for the $2^{nd}$ TB is equal to 1; and if H0>H1, an NDI for the $2^{nd}$ TB is equal to 0.

For example, if the value V indicated by the third bit is equal to 3m+1, where m is 0 or a positive integer, the DCI schedules one TB or two TBs. One bit in the fourth bit is used to indicate an NDI corresponding to the $1^{st}$ TB, other two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If H0=H1, the DCI schedules one TB, and a HARQ process number of the TB is H0. If H0≠H1, the DCI schedules two TBs, and HARQ process numbers of the two TBs are H0 and H1. If H0<H1, an NDI for the $2^{nd}$ TB is equal to 0; and if H0>H1, an NDI for the $2^{nd}$ TB is equal to 1. Alternatively, if H0<H1, an NDI for the $2^{nd}$ TB is equal to 1; and if H0>H1, an NDI for the $2^{nd}$ TB is equal to 0.

For example, if the value V indicated by the third bit is equal to 3m+2, where m is 0 or a positive integer, the DCI schedules one TB or two TBs. One bit in the fourth bit is used to indicate an NDI corresponding to the $1^{st}$ TB, other two bits in the fourth bit are used to indicate a first HARQ process number (H0), and remaining two bits in the fourth bit are used to indicate a second HARQ process number (H1). For example, H0 is indicated in {0, 1, 2, 3}. For example, H1 is indicated in {0, 1, 2, 3}. If H0=H1, the DCI schedules one TB, and a HARQ process number of the TB is H0. If H0≠H1, the DCI schedules two TBs, and HARQ process numbers of the two TBs are H0 and H1. If H0<H1, an NDI for the $2^{nd}$ TB is equal to 0; and if H0>H1, an NDI for the $2^{nd}$ TB is equal to 1. Alternatively, if H0<H1, an NDI for the $2^{nd}$ TB is equal to 1; and if H0>H1, an NDI for the $2^{nd}$ TB is equal to 0.

For example, if the value V indicated by the third bit is equal to 3m+2, where m is 0 or a positive integer, the DCI schedules three TBs. Three bits in the fourth bit are respectively used to indicate NDIs for three TBs. Two bits in the fourth bit indicate three HARQ process numbers H2 corresponding to three TBs. For example, H2 is indicated in {012, 013, 023, 123}. Alternatively, two bits in the fourth bit indicate NDIs for other two TBs, other than the $1^{st}$ TB, in three TBs, and two bits in the fourth bit indicate a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

For example, if the value V indicated by the third bit is equal to 3m+1, where m is 0 or a positive integer, the DCI schedules three TBs. Three bits in the fourth bit are respectively used to indicate NDIs for three TBs. Two bits in the fourth bit indicate three HARQ process numbers H2 corresponding to three TBs. For example, H2 is indicated in {012, 013, 023, 123}. Alternatively, two bits in the fourth bit indicate NDIs for other two TBs, other than the $1^{st}$ TB, in three TBs, and two bits in the fourth bit indicate a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

For example, if the value V indicated by the third bit is equal to 3m, where m is 0 or a positive integer, the DCI schedules three TBs. Three bits in the fourth bit are respectively used to indicate NDIs for three TBs. Two bits in the fourth bit indicate three HARQ process numbers H2 corresponding to three TBs. For example, H2 is indicated in {012, 013, 023, 123}. Alternatively, two bits in the fourth bit indicate NDIs for other two TBs, other than the $1^{st}$ TB, in three TBs, and two bits in the fourth bit indicate a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

For example, if the value V indicated by the third bit is equal to 3m, where m is 0 or a positive integer, the DCI schedules four TBs. HARQ process numbers corresponding to the four TBs are 0, 1, 2, and 3. Four bits in the fourth bit are respectively used to indicate NDIs corresponding to the four TBs.

For example, if the value V indicated by the third bit is equal to 3m+1, where m is 0 or a positive integer, the DCI schedules four TBs. HARQ process numbers corresponding to the four TBs are 0, 1, 2, and 3. Four bits in the fourth bit are respectively used to indicate NDIs corresponding to the four TBs.

For example, if the value V indicated by the third bit is equal to 3m+2, where m is 0 or a positive integer, the DCI schedules four TBs. HARQ process numbers corresponding to the four TBs are 0, 1, 2, and 3. Four bits in the fourth bit are respectively used to indicate NDIs corresponding to the four TBs.

Optionally, when L=4, one bit in the fourth bit is used to indicate that the MCS index is 10 or indicate that the MCS index is determined based on the value obtained after performing the rounding down operation on the first value V corresponding to the third bit with respect to 3. For example, one bit, other than four NDI indication bits, in the fourth bit is used to indicate that the MCS index is 10 or indicate that the MCS index is determined based on the value obtained after performing the rounding down operation on the first value V corresponding to the third bit with respect to 3. For example, when the bit is 0, it indicates that the MCS index is determined based on the value obtained after performing the rounding down operation on the first value V corresponding to the third bit with respect to 3; and when the bit is 1, it indicates that the MCS index is 10.

Optionally, when L=4, one bit in the fourth bit is used to indicate a first offset value. The first offset value is an integer greater than or equal to 0, for example, 0 or 1. The MCS index is determined based on the first offset value and a first value V that corresponds to the third bit. For example, the MCS index is determined based on a value obtained after performing the rounding down operation on a sum of the first value V corresponding to the third bit and the first offset value Z with respect to 3. For example, one bit, other than four NDI indication bits, in the fourth bit is used to indicate that the first offset value is Z, where Z=0 or Z=1, and the MCS index is determined based on the value obtained after performing the rounding down operation on V+Z with respect to 3, that is, the MCS index is determined based on floor(Z+V).

A value obtained after performing the remainder operation on the index indicated by the third bit with respect to 3 is 0, and the second node determines that the DCI schedules one TB or two TBs. The second node determines, based on one bit in the fourth bit, an NDI corresponding to the $1^{st}$ TB; determines the first HARQ process number (H0) based on other two bits in the fourth bit; and determines the second HARQ process number (H1) based on other two bits in the fourth bit. If H0=H1, the second node determines that the DCI schedules one TB, and a HARQ process number of the TB is H0. If H0≠H1, the second node determines that the DCI schedules two TBs, and HARQ process numbers of the two TBs are H0 and H1. If H0<H1, an NDI for the 2nd TB is equal to 0; and if H0>H1, an NDI for the $2^{nd}$ TB is equal to 1. Alternatively, if H0>H1, an NDI for the $2^{nd}$ TB is equal to 0; and if H0<H1, an NDI for the $2^{nd}$ TB is equal to 1.

A value obtained after performing the remainder operation on the index indicated by the third bit with respect to 3 is 1, and the second node determines that the DCI schedules three TBs. The second node determines NDIs for the three TBs based on three bits in the fourth bit. The second node determines, based on other two bits in the fourth bit, HARQ process numbers H2 corresponding to the three TBs. For example, H2 is indicated in {012, 013, 023, 123}. Alternatively, the second node determines NDIs for other two TBs, other than the $1^{st}$ TB, in the three TBs based on two bits in the fourth bit. The second node determines, based on other two bits in the fourth bit, a HARQ process number H2 (where a value of H2 is 0, 1, 2, or 3) that is not scheduled. In this case, HARQ process numbers corresponding to three TBs are three remaining process numbers, other than H2, in {0, 1, 2, 3}.

A value obtained after performing the remainder operation on the index indicated by the third bit with respect to 3 is 2, and the second node determines that the DCI schedules four TBs, and determines that HARQ process numbers corresponding to the four TBs are 0, 1, 2, and 3. The second node determines, based on four bits in the fourth bit, an NDI corresponding to each TB.

The following gives a definition of an $i^{th}$ TB in this application. DCI indicates or schedules N HARQ processes, and the N HARQ process numbers are arranged in ascending order. It is assumed that HARQ process numbers obtained after the N HARQ process numbers are sorted in ascending (or descending) order are M(0), M(1), . . . , and M(N−1). A HARQ process number of the $i^{th}$ TB is M(i−1), where i=1, . . . , or N.

The implementations of this application may be combined with each other if there is no contradiction.

In the implementations of this specification, a value corresponding to a bit may be a value indicated by the bit, or may be a decimal value obtained by converting a binary value of the bit. This is not specifically limited herein.

By using the foregoing communication method, indication can be performed more flexibly, coding complexity of a user terminal and a base station is reduced, and power consumption is reduced.

The module division in the embodiments of this application is an example, and is merely logical function division. During actual implementation, another division manner may be used. In addition, the functional modules in the embodiments of this application may be integrated into one processor, or may exist separately physically. Alternatively, two or more modules may be integrated into one module. The integrated module may be implemented in a form of hardware, or may be implemented in a form of a software functional module.

Figure 4:
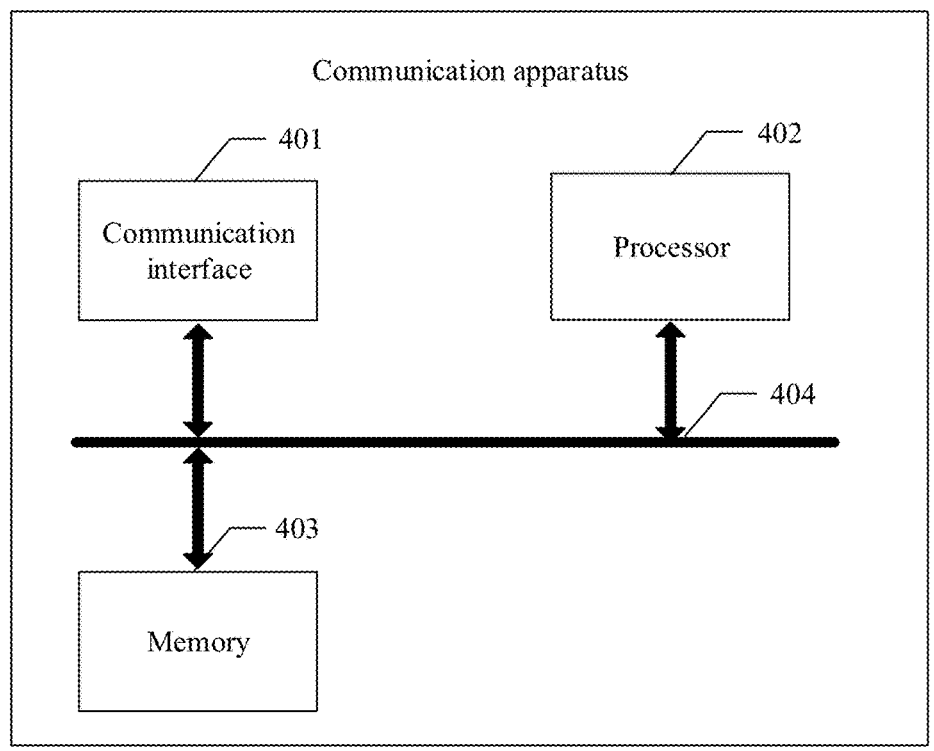
FIG. 4 is a schematic structural diagram of a communication apparatus according to an embodiment of this application.

When the integrated module can be implemented in a form of hardware, the communication apparatus may be shown in FIG. 4, and the processing unit 301 may be a processor 402. The processor 402 may be a CPU, a digital processing module, or the like. The transceiver unit 302 may be a communication interface 401. The communication interface 401 may be a transceiver, an interface circuit such as a transceiver circuit, a transceiver chip, or the like. The communication apparatus further includes a memory 403, configured to store a program executed by the processor 402. The memory 403 may be a non-volatile memory such as an HDD or an SSD, or may be a volatile memory such as a RAM. The memory 403 is, but is not limited to, any other medium capable of carrying or storing desired program code in a form of instructions or data structures and capable of being accessed by a computer.

The processor 402 is configured to execute the program code stored in the memory 403, and is specifically configured to perform actions of the processing unit 301. Details are not described herein again in this application.

A specific connection medium between the communication interface 401, the processor 402, and the memory 403 is not limited in this embodiment of this application. In this embodiment of this application, the memory 403, the processor 402, and the communication interface 401 are connected by using a bus 404 in FIG. 4. The bus is indicated by using a thick line in FIG. 4. A connection manner between other components is merely an example for description, and is not limited by reference. The bus may be classified into an address bus, a data bus, a control bus, and the like. For ease of representation, only one thick line is used to represent the bus in FIG. 4, but this does not mean that there is only one bus or only one type of bus.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of a method, a device (system), and a computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Clearly, a person skilled in the art can make various modifications and variations to embodiments of this application without departing from the spirit and scope of the embodiments of this application. This application is intended to cover these modifications and variations provided that they fall within the scope of protection defined by the following claims and their equivalent technologies.

What is claimed is:

1. A communication method comprising:
   determining, by a first device, first control information that includes first information indicating that emergency information is to be received, wherein the first control information includes a plurality of fields, wherein the plurality of fields of the first control information include a first field associated with the first information indicating that emergency information is to be received, and wherein all other fields of the first control information are set to 0;
   sending, by the first device, the first control information to a second device, wherein the first control information is carried in a type 0 common search space or a user-specific search space such that the second device does not need to monitor a type 2 search space for receiving the emergency information; and
   sending, by the first device, the emergency information to the second device, wherein the emergency information includes one or more of: an earthquake and tsunami warning system (ETWS) notification, or a commercial mobile alert service (CMAS) notification.

2. The method according to claim 1, wherein the first control information is downlink control information in a long term evolution (LTE) enhanced machine type communication (eMTC) system or downlink control information in a new radio (NR) system.

3. The method according to claim 1, wherein the first control information is format-3 control information, format-3A control information, format-6-0A control information, format-6-0B control information, format-6-1A control information, or format-6-1B control information in a long term evolution (LTE) enhanced machine type communication (eMTC) system.

4. The method according to claim 1, wherein before sending the first control information to the second device, the method further comprises:
   scrambling, by the first device, a cyclic redundancy check (CRC) code of the first control information using a system information radio network temporary identifier (SI-RNTI).

5. A communication method comprising:
   receiving, by a second device, first control information from a first device that includes first information indicating that emergency information is to be received, wherein the first control information includes a plurality of fields, wherein the plurality of fields of the first control information include a first field associated with the first information indicating that emergency information is to be received, and wherein all other fields of the first control information are set to 0; and
   in response to receiving the first control information, receiving, by the second device, the emergency information, wherein the first control information is carried in a type 0 common search space or a user-specific search space such that the second device does not need to monitor a type 2 search space for receiving the emergency information, and wherein the emergency information comprises one or more of: an earthquake and tsunami warning system (ETWS) notification, or a commercial mobile alert service (CMAS) notification.

6. The method according to claim 5, wherein the first control information is downlink control information in a long term evolution (LTE) enhanced machine type communication (eMTC) system or downlink control information in a new radio (NR) system.

7. The method according to claim 5, wherein the first control information is format-3 control information, format-3A control information, format-6-0A control information, format-6-0B control information, format-6-1A control information, or format-6-1B control information in a long term evolution (LTE) enhanced machine type communication (eMTC) system.

8. The method according to claim 5, wherein the first control information comprises a cyclic redundancy check (CRC) code which is scrambled by a system information radio network temporary identifier (SI-RNTI).

9. A first device comprising:
   a transceiver;
   at least one processor; and
   at least one memory having processor-executable instructions stored thereon;
   wherein the at least one processor is configured to execute the processor-executable instructions to facilitate the following being performed by the first device:
   determining first control information, wherein the first control information includes first information indicating that emergency information is to be received, wherein the first control information includes a plurality of fields, wherein the plurality of fields of the first control information include a first field associated with the first information indicating that emergency information is to be received, and wherein all other fields of the first control information are set to 0;
   sending, via the transceiver, the first control information to a second device, wherein the first control information is carried in a type 0 common search space or a user-specific search space such that the second device does not need to monitor a type 2 search space for receiving the emergency information; and
   sending, via the transceiver, the emergency information to the second device, wherein the emergency information includes one or more of: an earthquake and tsunami warning system (ETWS) notification, or a commercial mobile alert service (CMAS) notification.

10. The first device according to claim 9, wherein the first control information is downlink control information in a long term evolution (LTE) enhanced machine type communication (eMTC) system or downlink control information in a new radio (NR) system.

11. The first device according to claim 9, wherein the first control information is format-3 control information, format-3A control information, format-6-0A control information, format-6-0B control information, format-6-1A control information, or format-6-1B control information in a long term evolution (LTE) enhanced machine type communication (eMTC) system.

12. The first device according to claim 9, wherein the at least one processor is further configured to execute the processor-executable instructions to facilitate the following being performed by the first device:
   before sending the first control information to the second device, scrambling, by the first device, a cyclic redundancy check (CRC) code of the first control information using a system information radio network temporary identifier (SI-RNTI).

13. A second device comprising:
a transceiver;
at least one processor; and
at least one memory having processor-executable instructions stored thereon;
wherein the at least one processor is configured to execute the processor-executable instructions to facilitate the following being performed by the second device:
receiving, via the transceiver, first control information from a first device that includes first information indicating that emergency information is to be received, wherein the first control information includes a plurality of fields, wherein the plurality of fields of the first control information include a first field associated with the first information indicating that emergency information is to be received, and wherein all other fields of the first control information are set to 0; and
in response to receiving the first control information, receiving, via the transceiver, the emergency information, wherein the first control information is carried in a type 0 common search space or a user-specific search space such that the second device does not need to monitor a type 2 search space for receiving the emergency information, wherein the emergency information includes one or more of: an earthquake and tsunami warning system (ETWS) notification, or a commercial mobile alert service (CMAS) notification.

14. The second device according to claim 13, wherein the first control information is downlink control information in a long term evolution (LTE) enhanced machine type communication (eMTC) system or downlink control information in a new radio (NR) system.

15. The second device according to claim 13, wherein the first control information is format-3 control information, format-3A control information, format-6-0A control information, format-6-0B control information, format-6-1A control information, or format-6-1B control information in a long term evolution (LTE) enhanced machine type communication (eMTC) system.

16. The second device according to claim 13, wherein the first control information comprises a cyclic redundancy check (CRC) code which is scrambled by a system information radio network temporary identifier (SI-RNTI).

17. The method according to claim 1, wherein the first control information is format-3 or format-3A control information, and wherein one or more transmit power control (TPC) commands in the first control information indicate the first information.

18. The method according to claim 5, wherein the first control information is format-3 or format-3A control information, and wherein one or more transmit power control (TPC) commands in the first control information indicate the first information.

19. The first device according to claim 9, wherein the first control information is format-3 or format-3 A control information, and wherein one or more transmit power control (TPC) commands in the first control information indicate the first information.

20. The second device according to claim 13, wherein the first control information is format-3 or format-3A control information, and wherein one or more transmit power control (TPC) commands in the first control information indicate the first information.

* * * * *